US012182577B2

(12) United States Patent
Ovsiannikov et al.

(10) Patent No.: US 12,182,577 B2
(45) Date of Patent: Dec. 31, 2024

(54) NEURAL-PROCESSING UNIT TILE FOR SHUFFLING QUEUED NIBBLES FOR MULTIPLICATION WITH NON-ZERO WEIGHT NIBBLES

(71) Applicant: Samsung Electronics Co., Ltd., Suwon-si (KR)

(72) Inventors: Ilia Ovsiannikov, Porter Ranch, CA (US); Ali Shafiee Ardestani, San Jose, CA (US); Hamzah Ahmed Ali Abdelaziz, San Jose, CA (US); Joseph H. Hassoun, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 227 days.

(21) Appl. No.: 16/847,504

(22) Filed: Apr. 13, 2020

(65) Prior Publication Data
US 2020/0349106 A1 Nov. 5, 2020

Related U.S. Application Data

(60) Provisional application No. 62/841,606, filed on May 1, 2019.

(51) Int. Cl.
*G06F 9/38* (2018.01)
*G06F 15/80* (2006.01)

(52) U.S. Cl.
CPC ............ *G06F 9/3885* (2013.01); *G06F 15/80* (2013.01)

(58) Field of Classification Search
CPC ...... G06F 7/5443; G06F 9/3885; G06F 15/80; G06F 2015/763; G06N 3/063
See application file for complete search history.

(56) References Cited

U.S. PATENT DOCUMENTS 5,285,403 A 2/1994 Quisquater et al.
6,061,749 A 5/2000 Webb et al.
(Continued)

FOREIGN PATENT DOCUMENTS

CN 1318232 A 10/2001
CN 104426630 A 3/2015
(Continued)

OTHER PUBLICATIONS

Ahmad et al., "FPGA-based Accelerators of Deep Learning Networks for Learning and Classification: A Review," Jan. 1, 2019, Date of publication 2018 00, 0000, date of current version 2018 00, 0000. Digital Object Identifier 10.1109/ACCESS.2018.2890150. DOI, arXiv:1901.00121v1[cs.NE], pp. 1-41.
(Continued)

*Primary Examiner* — David J. Huisman
(74) *Attorney, Agent, or Firm* — Lewis Roca Rothgerber Christie LLP

(57) ABSTRACT

A processor. In some embodiments, the processor includes: a first tile, the first tile being configured: to feed a first nibble from a third queue, through a first shuffler, to a first multiplier, and to multiply, in the first multiplier, the first nibble from the third queue by a first nibble of a third weight; to feed a second nibble from the third queue, through the first shuffler, to a second multiplier, and to multiply, in the second multiplier, the second nibble from the third queue by a second nibble of the third weight; and to feed a first nibble from a fourth queue, through the first shuffler, to a third multiplier, and to multiply, in the third multiplier, the first nibble from the fourth queue by a first nibble of a fourth weight.

19 Claims, 27 Drawing Sheets

(56) References Cited

U.S. PATENT DOCUMENTS

| | | | |
|---|---|---|---|
| 7,050,410 | B1 | 5/2006 | Kim et al. |
| 9,418,458 | B2 | 8/2016 | Chertok et al. |
| 9,721,203 | B1 | 8/2017 | Young et al. |
| 9,836,691 | B1 | 12/2017 | Narayanaswami et al. |
| 9,904,874 | B2 | 2/2018 | Shoaib et al. |
| 10,438,117 | B1 | 10/2019 | Ross et al. |
| 10,521,488 | B1 | 12/2019 | Ross et al. |
| 10,664,751 | B2 | 5/2020 | Henry et al. |
| 10,706,147 | B1 | 7/2020 | Pohlack et al. |
| 11,250,326 | B1* | 2/2022 | Ko .............. G06N 3/0481 |
| 2010/0284456 | A1 | 11/2010 | Frank |
| 2015/0170021 | A1 | 6/2015 | Lupon et al. |
| 2016/0162782 | A1 | 6/2016 | Park |
| 2017/0011288 | A1 | 1/2017 | Brothers et al. |
| 2017/0103306 | A1 | 4/2017 | Henry et al. |
| 2017/0103314 | A1 | 4/2017 | Ross |
| 2017/0124452 | A1 | 5/2017 | Tucker et al. |
| 2017/0316312 | A1 | 11/2017 | Goyal et al. |
| 2017/0357891 | A1 | 12/2017 | Judd et al. |
| 2018/0032859 | A1 | 2/2018 | Park et al. |
| 2018/0046894 | A1 | 2/2018 | Yao |
| 2018/0046906 | A1 | 2/2018 | Dally et al. |
| 2018/0046913 | A1 | 2/2018 | Yu et al. |
| 2018/0096226 | A1 | 4/2018 | Aliabadi et al. |
| 2018/0101743 | A1 | 4/2018 | Yang et al. |
| 2018/0129935 | A1 | 5/2018 | Kim et al. |
| 2018/0181857 | A1 | 6/2018 | Mathew et al. |
| 2018/0181858 | A1 | 6/2018 | Son et al. |
| 2018/0189642 | A1 | 7/2018 | Boesch et al. |
| 2018/0217962 | A1 | 8/2018 | Takahashi |
| 2018/0218518 | A1 | 8/2018 | Yan et al. |
| 2018/0253636 | A1 | 9/2018 | Lee et al. |
| 2018/0259970 | A1 | 9/2018 | Wang et al. |
| 2018/0285254 | A1 | 10/2018 | Baum et al. |
| 2018/0307495 | A1 | 10/2018 | Ould-Ahmed-Vall et al. |
| 2018/0307783 | A1 | 10/2018 | Hah et al. |
| 2018/0307950 | A1 | 10/2018 | Nealis et al. |
| 2019/0042923 | A1 | 2/2019 | Janedula et al. |
| 2019/0065896 | A1 | 2/2019 | Lee et al. |
| 2019/0066257 | A1 | 2/2019 | Daga et al. |
| 2019/0079764 | A1 | 3/2019 | Diamond et al. |
| 2019/0114511 | A1 | 4/2019 | Gao et al. |
| 2019/0130250 | A1 | 5/2019 | Park et al. |
| 2019/0138898 | A1 | 5/2019 | Song et al. |
| 2019/0147327 | A1 | 5/2019 | Martin |
| 2019/0156201 | A1 | 5/2019 | Bichler et al. |
| 2019/0205095 | A1 | 7/2019 | Gupta et al. |
| 2019/0236049 | A1 | 8/2019 | Vantrease et al. |
| 2019/0317732 | A1 | 10/2019 | Xu et al. |
| 2019/0392287 | A1 | 12/2019 | Ovsiannikov et al. |
| 2020/0210517 | A1 | 7/2020 | Baum et al. |
| 2021/0011732 | A1 | 1/2021 | Botimer et al. |

FOREIGN PATENT DOCUMENTS

| | | |
|---|---|---|
| CN | 106650922 A | 5/2017 |
| CN | 108615036 A | 10/2018 |
| CN | 110110707 A | 8/2019 |
| JP | 2018-92561 A | 6/2018 |
| KR | 10-2014-0122161 A | 10/2014 |
| TW | 201706871 A | 2/2017 |
| WO | 2016/186826 A1 | 11/2016 |
| WO | WO 2016/186801 A1 | 11/2016 |
| WO | WO 2017/142397 A1 | 8/2017 |
| WO | WO 2017/186830 A1 | 11/2017 |
| WO | 2019/213745 A1 | 11/2019 |

OTHER PUBLICATIONS

Aimar et al., "Nullhop: A Flexible Convolutional Neural Network Accerlerator Based on Sparse Representations of Feature Maps," Mar. 6, 2018, arXiv:1706.01406v2 [cs.CV], pp. 1-13.

Lascorz, A.D. et al., "Bit-Tactical: Exploiting Ineffectual Computations in Convolutional Neural Networks: Which, Why, and How", Cornell University, Computer Science, Neural and Evolutionary Computing, Mar. 9, 2018, pp. 1-14, arXiv:1803.03688v1.

Shaoli et al., "Cambricon: An Instruction Set Architecture for Neural Networks," 2016 ACM/IEEE 43rd Annual International Symposium on Computer Architecture, pp. 1-13.

Yu-Hsin et al., "Eyeriss v2: A Flexible Accelerator for Emerging Deep Neural Networks on Mobile Devices," May 20, 2019, arXiv:1807.07928v2 [cs.DC], pp. 1-21.

Mittal, Sparsh, "A survey of FPGA-based accelerators for convolutional neural networks," Neural Computing and Applications, 2020, pp. 1109-1139.

Sombatsiri, Salita, et al., "Parallelism-Flexible Convolution Core for Sparse Convolutional Neural Networks," SASIMI 2018 Proceedings, 2018, pp. 188-193.

Jorge Albericio, Bit-Pragmatic Deep Neural Network Computing, Oct. 2017, MICRO-50, p. 385-387, 390. (Year: 2017).

U.S. Office Action dated Jun. 2, 2022, issued in U.S. Appl. No. 16/552,619, 14 pages.

U.S. Office Action dated Jun. 6, 2022, issued in U.S. Appl. No. 16/446,610, 14 pages.

U.S. Notice of Allowance dated Jun. 8, 2022, issued in U.S. Appl. No. 16/552,945, 12 pages.

U.S. Office Action dated Jun. 14, 2022, issued in U.S. Appl. No. 16/552,850, 17 pages.

U.S. Office Action dated Jul. 7, 2022, issued in U.S. Appl. No. 16/900,819, 15 pages.

U.S. Notice of Allowance dated Apr. 13, 2023, issued in U.S. Appl. No. 16/840,172 (10 pages).

U.S. Notice of Allowance dated Feb. 1, 2023, issued in U.S. Appl. No. 16/552,945 (5 pages).

U.S. Notice of Allowance dated Feb. 13, 2023, issued in U.S. Appl. No. 16/446,610 (5 pages).

U.S. Notice of Allowance dated Feb. 23, 2023, issued in U.S. Appl. No. 16/552,619 (5 pages).

U.S. Office Action dated Feb. 28, 2023, issued in U.S. Appl. No. 16/900,819 (16 pages).

U.S. Notice of Allowance dated Mar. 2, 2023, issued in U.S. Appl. No. 16/552,850 (5 pages).

U.S. Office Action dated Sep. 18, 2023, issued in U.S. Appl. No. 16/900,819 (14 pages).

U.S. Notice of Allowance dated Sep. 21, 2022, issued in U.S. Appl. No. 16/552,945 (5 pages).

U.S. Final Office Action dated Oct. 12, 2022, issued in U.S. Appl. No. 16/900,819 (15 pages).

U.S. Notice of Allowance dated Oct. 13, 2022, issued in U.S. Appl. No. 16/552,619 (10 pages).

U.S. Office Action dated Oct. 14, 2022, issued in U.S. Appl. No. 16/840,172 (53 pages).

U.S. Notice of Allowance dated Oct. 14, 2022, issued in U.S. Appl. No. 16/552,850 (9 pages).

U.S. Final Office Action dated Nov. 28, 2022, issued in U.S. Appl. No. 16/446,610 (9 pages).

U.S. Advisory dated Jan. 3, 2023, issued in U.S. Appl. No. 16/900,819 (3 pages).

U.S. Final Office Action dated May 30, 2023, issued in U.S. Appl. No. 16/900,819 (15 pages).

Taiwanese Search Report dated Sep. 20, 2023, issued in Taiwanese Patent Application No. 109132495 (2 pages).

US Office Action dated Mar. 15, 2024, issued in U.S. Appl. No. 18/219,904 (10 pages).

US Final Office Action dated Dec. 20, 2023, issued in U.S. Appl. No. 16/900,819 (14 pages).

Chinese Notice of Allowance dated Jan. 5, 2024, issued in corresponding Chinese Patent Application No. 202010298622.2 (4 pages).

Korean Office Action dated Oct. 15, 2024, issued in corresponding Korean Patent Application No. 10-2020-0046422 (11 pages).

US Office Action dated Oct. 15, 2024, issued in U.S. Appl. No. 18/601,739 (9 pages).

* cited by examiner

| NN Model | Pruned | Winograd | SkipMult. | uint4 (no shift) | | | | FP4.3 (shift) Act. + Weight | | | |
|---|---|---|---|---|---|---|---|---|---|---|---|
| | | | Mult.by 0 | 8x8 | 4x4 | 4a x 8w | 8a x 4w | 8x8 | 4x4 | 4a x 8w | 8a x 4w |
| GNMT encoder | | | 23.64082% | 0.0213% | 65.7035% | 10.53656% | 0.097778% | 0.00500% | 70.55367% | 5.75506% | 0.045439% |
| ResNet-50 | | | 66.54871% | 1.276359% | 23.006999% | 6.43863% | 2.67532% | 0.44319% | 27.37381% | 3.94375% | 1.636534% |
| MobileNet v2 1.0 224 | | | 28.6577% | 10.5137% | 28.0407% | 18.00085% | 15.2089% | 3.68937% | 43.6771% | 13.6035% | 10.8018% |
| Inception-v3 | | | 65.40830% | 0.82306% | 26.925593% | 4.14988% | 2.65363% | 0.29225% | 30.31663% | 2.42908% | 1.51454% |
| Inception-v3 | Pruned | | 79.93836% | 0.93820% | 13.85007% | 2.36906% | 2.90432% | 0.29720% | 16.58238% | 1.47644% | 1.70561% |
| Inception-v3 | | Winograd | 57.49692% | 0.19421% | 38.30902% | 2.74792% | 1.25193% | 0.07001% | 40.24185% | 1.50183% | 0.68939% |
| Inception-v3 | Pruned | Winograd | 67.33983% | 0.26615% | 27.218999% | 4.02804% | 1.14700% | 0.08358% | 29.78001% | 2.13383% | 0.66275% |

FIG. 1C

| Support | Product Bit Width | Adder Tree Width* Assuming 16 IFM lanes | Cycles | Pre-Adder Tree Shift | Pre-AccumulatorShift |
|---|---|---|---|---|---|
| 4-bit IFM x 4-bit weight | 4+4=8 | 8+4 = 12 bit + sign | 1 | 0 | 0 |
| 4-bit IFM x 8-bit weight | 4+8=12 | 12+4 = 16 bit + sign | 1..2 | 0, 4 | 0 |
| 8-bit IFM x 4-bit weight | 8+4=12 if adder tree allowed to reduce pixel pair<br>4+4=8 if adder tree reduces one pixel at a time | 12+4 = 16 + bit sign<br>8+4 = 12 + bit sign | 1..2 | 0, 4<br>0 | 0<br>0, 4 |
| 8-bit IFM x 8-bit weight | 8+8=16 if adder tree allowed to reduce pixel pair<br>4+8=12 if adder tree reduces one pixel at a time | 16+4 = 20 + bit sign<br>12+4 = 16 + bit sign | 1..3 | 0, 4<br>0 | 0<br>0, 4 |

\* Add 2^x when using FP4.x IFM
Add 2^y when using FP4.y weights

FIG. 2H

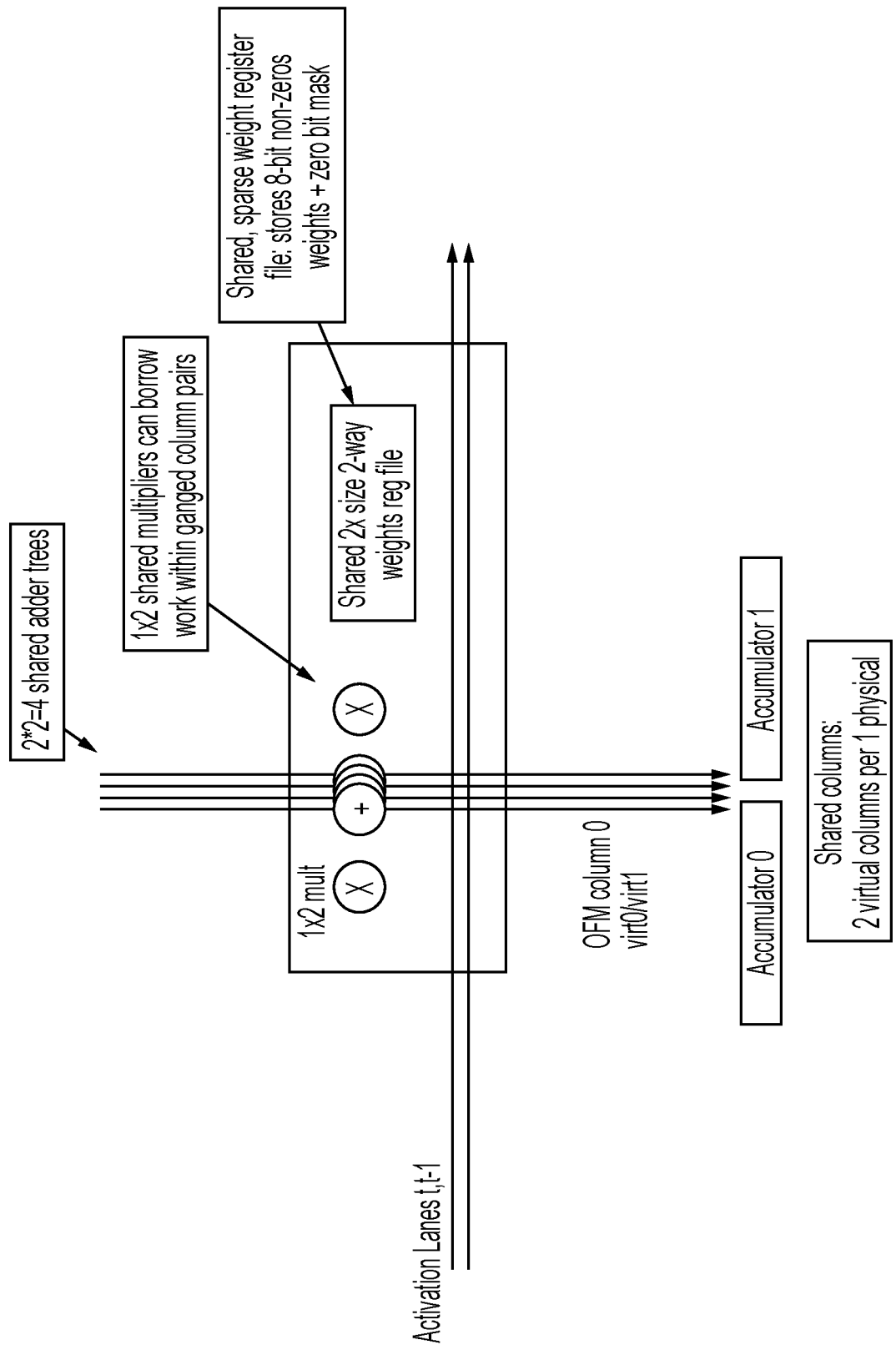

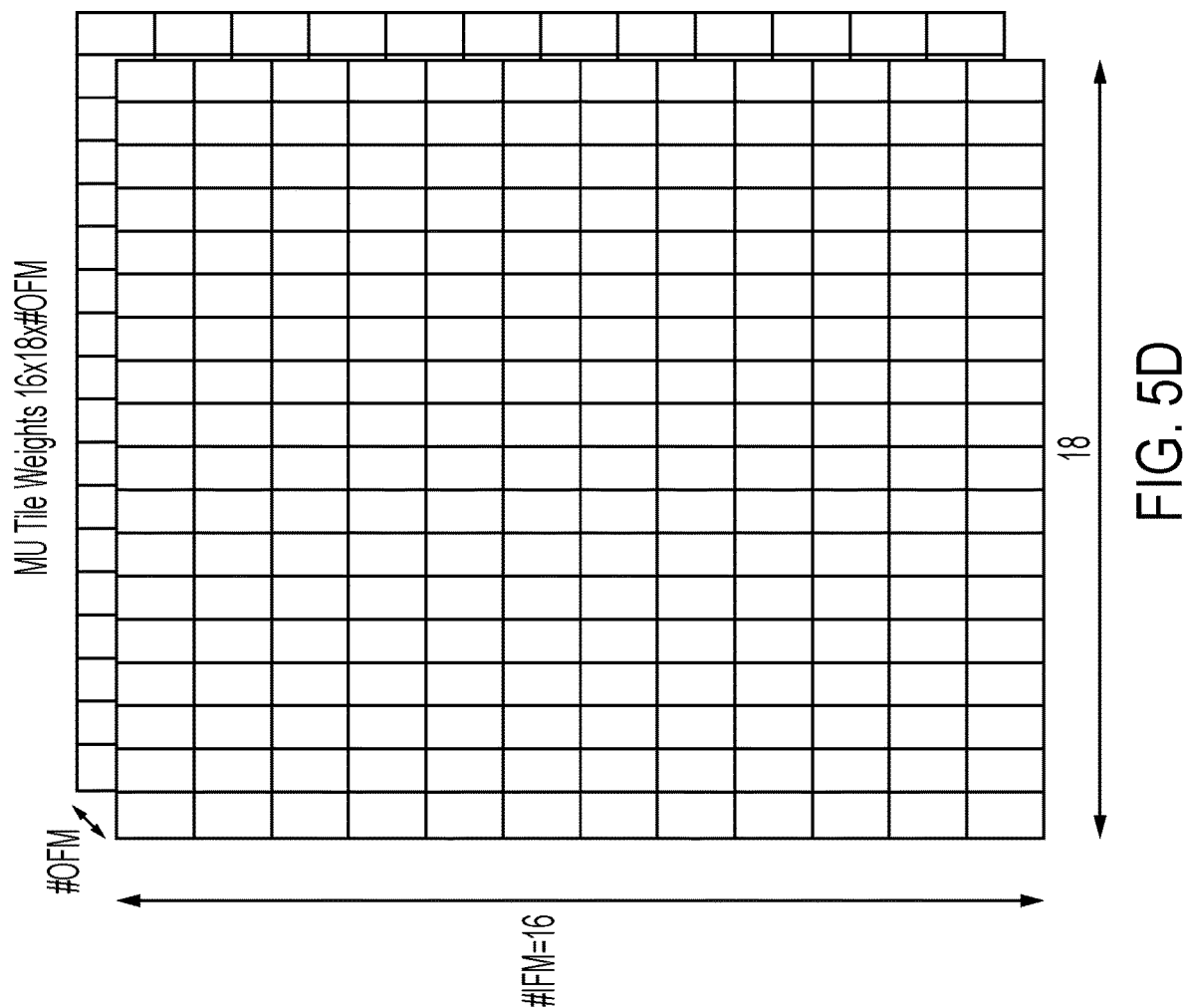

NEURAL-PROCESSING UNIT TILE FOR SHUFFLING QUEUED NIBBLES FOR MULTIPLICATION WITH NON-ZERO WEIGHT NIBBLES

CROSS-REFERENCE TO RELATED APPLICATION(S)

The present application claims priority to and the benefit of U.S. Provisional Application No. 62/841,606, filed May 1, 2019, entitled "MIXED-PRECISION NEURAL-PROCESSING UNIT TILE", the entire content of which is incorporated herein by reference.

The present application is related to U.S. patent application Ser. No. 16/446,610, filed on Jun. 19, 2019 entitled "NEURAL PROCESSOR", ("the '610 application"), the entire content of which is incorporated herein by reference.

FIELD

One or more aspects of embodiments according to the present disclosure relate to neural processors, and more particularly to a mixed-precision neural processor.

BACKGROUND

In operation, a neural processing unit (NPU), or "neural processor" may perform large numbers of multiplications and additions, multiplying activations by weights, for example, and summing the results. In some applications, such as when images or video taken from a moving vehicle are used to identify hazards, minimizing latency may be important, and, in some applications, such as applications executing on battery-powered mobile devices, minimizing power consumption may be important.

Thus, there is a need for a system and method for reducing power consumption and latency in a neural processor.

SUMMARY

According to an embodiment of the present invention, there is provided a processor, including: a first tile, a second tile, a memory, and a bus, the bus being connected to: the memory, the first tile, and the second tile, the first tile including: a first weight register storing a first weight, the first weight being zero; a second weight register storing a third weight, the third weight being an eight-bit number neither nibble of which is zero; a third weight register storing a second weight, the second weight being zero; a fourth weight register storing a fourth weight, the fourth weight being an eight-bit number neither nibble of which is zero; an activations buffer; a first shuffler; a first multiplier connected to the first weight register; a second multiplier connected to the second weight register; a third multiplier connected to the third weight register; and a fourth multiplier connected to the fourth weight register, the activations buffer being configured to include: a first queue, a second queue, a third queue, and a fourth queue, the first tile being configured: to feed a first nibble from the third queue, through the first shuffler, to the first multiplier, and to multiply, in the first multiplier, the first nibble from the third queue by a first nibble of the third weight; to feed a second nibble from the third queue, through the first shuffler, to the second multiplier, and to multiply, in the second multiplier, the second nibble from the third queue by a second nibble of the third weight; to feed a first nibble from the fourth queue, through the first shuffler, to the third multiplier, and to multiply, in the third multiplier, the first nibble from the fourth queue by a first nibble of the fourth weight; and to feed a second nibble from the fourth queue, through the first shuffler, to the fourth multiplier, and to multiply, in the fourth multiplier, the second nibble from the fourth queue by a second nibble of the fourth weight.

In some embodiments: a third nibble of the first queue is zero, a third nibble of the second queue is zero, a third nibble of the third queue is zero, and a third nibble of the fourth queue is zero, and the first tile is further configured, when the third nibble of the first queue is at the front of the of the first queue, to advance: the first queue, the second queue, the third queue, and the fourth queue without performing multiplications with any of: the third nibble of the first queue, the third nibble of the second queue, the third nibble of the third queue, and the third nibble of the fourth queue.

In some embodiments: a fifth nibble of the first queue and a sixth nibble of the first queue together store an eight-bit number consisting of a most significant nibble and a least significant nibble, the most significant nibble being equal to one, and the least significant nibble being even; and the first tile is configured, when processing the fifth nibble of the first queue and the sixth nibble of the first queue, to: replace the most significant nibble with zero; shift the least significant nibble to the right by one bit and set its most significant bit to one; and set a flag indicating that the fifth nibble of the first queue and the sixth nibble of the first queue together store the mantissa of a floating point number the exponent of which is one.

In some embodiments, the first shuffler is a butterfly shuffler.

In some embodiments: the first multiplier, the second multiplier, the third multiplier, and the fourth multiplier are arranged in a first column, and the first tile further includes: a second shuffler connected to the activations buffer; a fifth multiplier connected to a fifth weight register and to the second shuffler; a sixth multiplier connected to a sixth weight register and to the second shuffler; a seventh multiplier connected to a seventh weight register and to the second shuffler; and an eighth multiplier connected to an eighth weight register and to the second shuffler.

According to an embodiment of the present invention, there is provided a method for calculating with a processing circuit, the processing circuit including: a first tile, a second tile, a memory, and a bus, the bus being connected to: the memory, the first tile, and the second tile, the first tile including: a first weight register storing a first weight, the first weight being zero; a second weight register storing a third weight, the third weight being an eight-bit number neither nibble of which is zero; a third weight register storing a second weight, the second weight being zero; a fourth weight register storing a fourth weight, the fourth weight being an eight-bit number neither nibble of which is zero; an activations buffer; a first shuffler; a first multiplier connected to the first weight register; a second multiplier connected to the second weight register; a third multiplier connected to the third weight register; and a fourth multiplier connected to the fourth weight register, the activations buffer being configured to include: a first queue, a second queue, a third queue, and a fourth queue, the method including: feeding a first nibble from the third queue, through the first shuffler, to the first multiplier, and multiplying, in the first multiplier, the first nibble from the third queue by a first nibble of the third weight; feeding a second nibble from the third queue, through the first shuffler, to the second multiplier, and to multiplying, in the second multiplier, the second nibble from the third queue by a second nibble of the third weight; feeding a first nibble from the fourth queue, through the first shuffler, to the third multiplier, and multiplying, in the third multiplier, the first nibble from the fourth queue by a first nibble of the fourth weight; and feeding a second nibble from the fourth queue, through the first shuffler, to the fourth multiplier, and multiplying, in the fourth multiplier, the second nibble from the fourth queue by a second nibble of the fourth weight.

In some embodiments: a third nibble of the first queue is zero, a third nibble of the second queue is zero, a third nibble of the third queue is zero, and a third nibble of the fourth queue is zero, and the method further includes, when the third nibble of the first queue is at the front of the of the first queue, advancing the first queue, the second queue, the third queue, and the fourth queue without performing multiplications with any of: the third nibble of the first queue, the third nibble of the second queue, the third nibble of the third queue, and the third nibble of the fourth queue.

In some embodiments: a fifth nibble of the first queue and a sixth nibble of the first queue together store an eight-bit number consisting of a most significant nibble and a least significant nibble, the most significant nibble being equal to one, and the least significant nibble being even; and the method further includes, when processing the fifth nibble of the first queue and the sixth nibble of the first queue: replacing the most significant nibble with zero; shifting the least significant nibble to the right by one bit and settinq its most significant bit to one; and setting a flag indicating that the fifth nibble of the first queue and the sixth nibble of the first queue together store the mantissa of a floating point number the exponent of which is one.

In some embodiments, the first shuffler is a butterfly shuffler.

In some embodiments: the first multiplier, the second multiplier, the third multiplier, and the fourth multiplier are arranged in a first column, and the first tile further includes: a second shuffler connected to the activations buffer; a fifth multiplier connected to a fifth weight register and to the second shuffler; a sixth multiplier connected to a sixth weight register and to the second shuffler; a seventh multiplier connected to a seventh weight register and to the second shuffler; and an eighth multiplier connected to an eighth weight register and to the second shuffler.

According to an embodiment of the present invention, there is provided a method for calculating with a means for processing, the means for processing including: a first tile, a second tile, a memory, and a bus, the bus being connected to: the memory, the first tile, and the second tile, the first tile including: a first weight register storing a first weight, the first weight being zero; a second weight register storing a third weight, the third weight being an eight-bit number neither nibble of which is zero; a third weight register storing a second weight, the second weight being zero; a fourth weight register storing a fourth weight, the fourth weight being an eight-bit number neither nibble of which is zero; an activations buffer; a first shuffler; a first multiplier connected to the first weight register; a second multiplier connected to the second weight register; a third multiplier connected to the third weight register; and a fourth multiplier connected to the fourth weight register, the activations buffer being configured to include: a first queue, a second queue, a third queue, and a fourth queue, the method including: feeding a first nibble from the third queue, through the first shuffler, to the first multiplier, and multiplying, in the first multiplier, the first nibble from the third queue by a first nibble of the third weight; feeding a second nibble from the third queue, through the first shuffler, to the second multiplier, and multiplying, in the second multiplier, the second nibble from the third queue by a second nibble of the third weight; feeding a first nibble from the fourth queue, through the first shuffler, to the third multiplier, and multiplying, in the third multiplier, the first nibble from the fourth queue by a first nibble of the fourth weight; and feeding a second nibble from the fourth queue, through the first shuffler, to the fourth multiplier, and multiplying, in the fourth multiplier, the second nibble from the fourth queue by a second nibble of the fourth weight.

BRIEF DESCRIPTION OF THE DRAWINGS

These and other features and advantages of the present disclosure will be appreciated and understood with reference to the specification, claims, and appended drawings wherein:

FIG. 1C is a table, according to an embodiment of the present disclosure;

FIG. 2H is a table, according to an embodiment of the present disclosure;

FIG. 5B is a block diagram, according to an embodiment of the present disclosure;

FIG. 5D is a data layout diagram, according to an embodiment of the present disclosure.

DETAILED DESCRIPTION

The detailed description set forth below in connection with the appended drawings is intended as a description of exemplary embodiments of a mixed-precision neural-processing unit tile provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
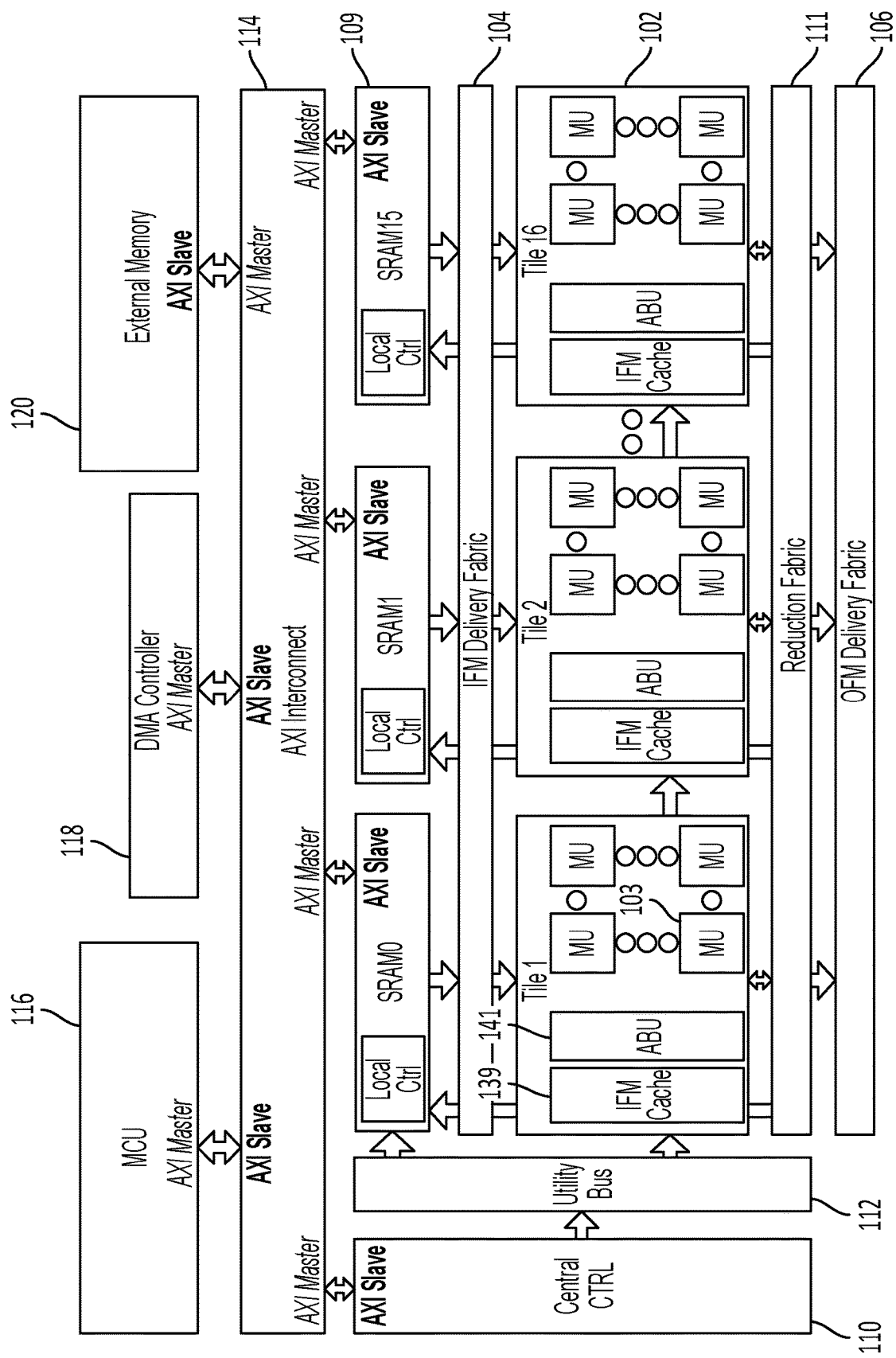
FIG. 1A is a block diagram, according to an embodiment of the present disclosure.

FIG. 1A shows a high-level block diagram of a neural processor, according to some embodiments. The neural processor may be configured to efficiently calculate a convolution or a tensor product of an input feature map (IFM) (or a tensor of "activations") with a multi-dimensional array (or tensor) of weights, to form an output feature map (OFM). The neural processor may also be configured to compute feature map pooling and activation function.

A plurality of SRAM bank sets 109 (each including several, e.g., four SRAM banks) may be connected to Multiply-and-Reduce tiles 102 (or "MR tiles") through an input feature map (IFM) delivery fabric 104 that brings input activation maps stored in SRAM bank sets 109 to tiles 102 for subsequent computation. Each tile 102 may contain an array of multiplier units (MU) 103 and an Activation Broadcast Unit (ABU) 141. Each tile may be connected to a Reduction Fabric 111. Tiles 102 also connect to the SRAM bank sets 109 via an output feature map (OFM) delivery fabric 106 that transmits computed results from tiles 102 to SRAM bank sets 109 for storage.

The IFM delivery fabric 104 may be a segmented bus, and, as a result, each one of the SRAM bank sets 109 may be associated with one of the tiles 102. A central controller 110 may supply control words to control registers in the system via a utility bus 112. Data may be delivered to the neural processor via an AXI (Advanced Extensible Interconnect) interconnect 114 and the results of processing operations performed by the neural processor may similarly be retrieved via the AXI interconnect 114. An MCU (microcontroller) 116 can be used to orchestrate computation by properly configuring the central controller in a timely fashion, as well as coordinating and executing data transfers using the DMA controller 118 between the neural processor and an external memory 120.

In NPU applications, parallel streams of sparse data may be compressed. Sparse data can be in the format of int8, uint8, int16, or uint16, for example. These streams are treated as streams of nibbles, by subdividing a byte into two nibbles. Weights and activations are sparse in these byte-sized data.

When breaking down bytes into nibbles, the weights and activations become even more sparse; data with such a degree of sparsity may be referred to as "remarkably sparse". Activations and weights predominantly have small absolute values. Therefore, the most significant nibble (MSN) is typically zero, even for nonzero activations and weights. As the level of sparsity becomes more extreme, the NPU architecture can be utilized to more efficiently process this data.

Figure 1B:
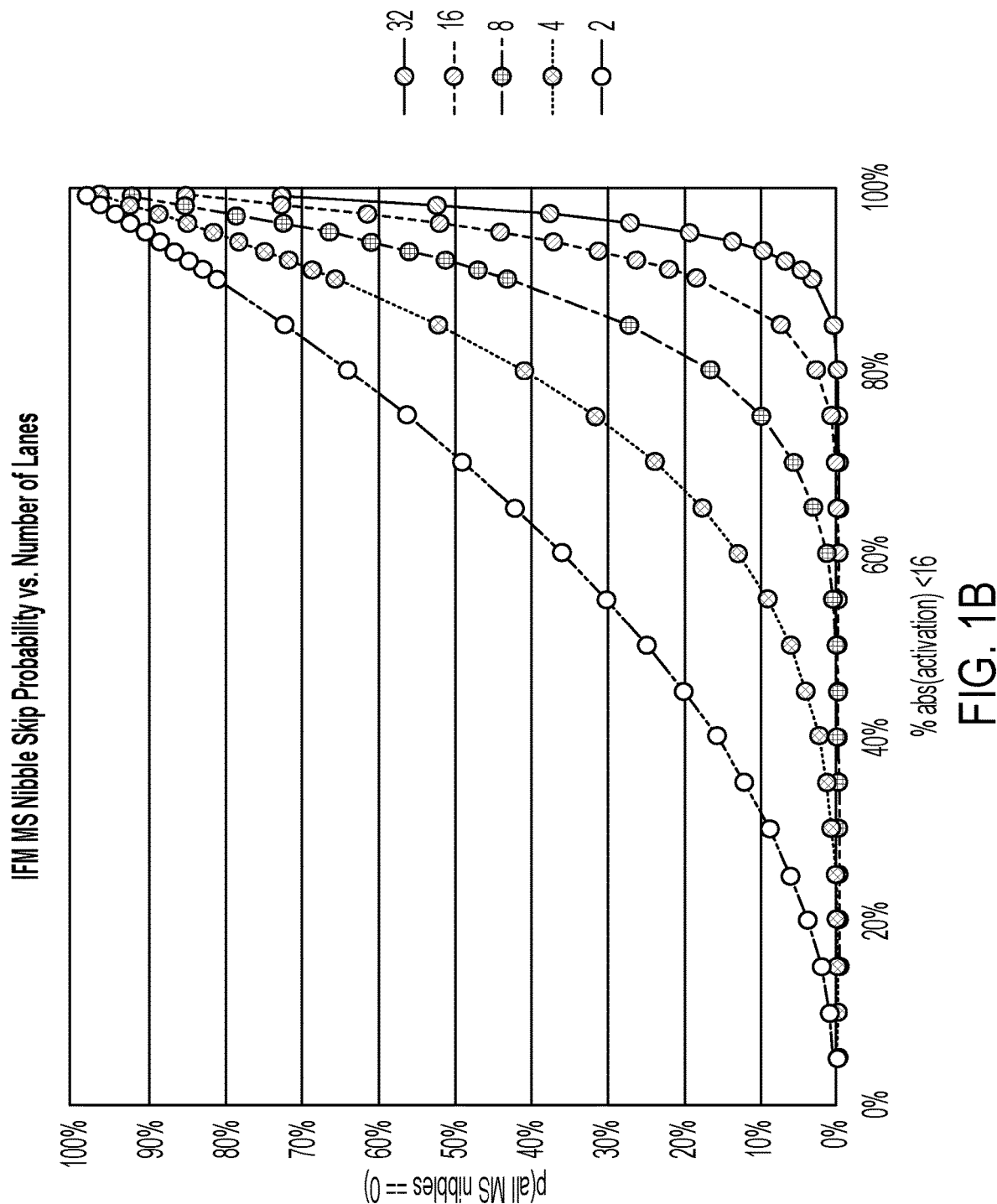
FIG. 1B is a graph, according to an embodiment of the present disclosure.

In one illustrative example, an incoming data stream is to be compressed and stored over 16 lanes. Due to the distribution statistics of the data values, the MSNs are remarkably sparse, containing zeros for unsigned data or all one values for signed data. The probability of all 16 MSNs being zero is shown in FIG. 1B for different percentages of activations. For a large number of cases with four MSNs the probability is at or near 0% of all MSNs being zero, meaning the disclosed systems can skip the input feature map (IFM) multiply operation. The probability of four MSNs being zero is much higher than the probability of 16 MSNs being zero. FIG. 1C is a table of various metrics of sparsity for several different neural networks.

Figure 2A:
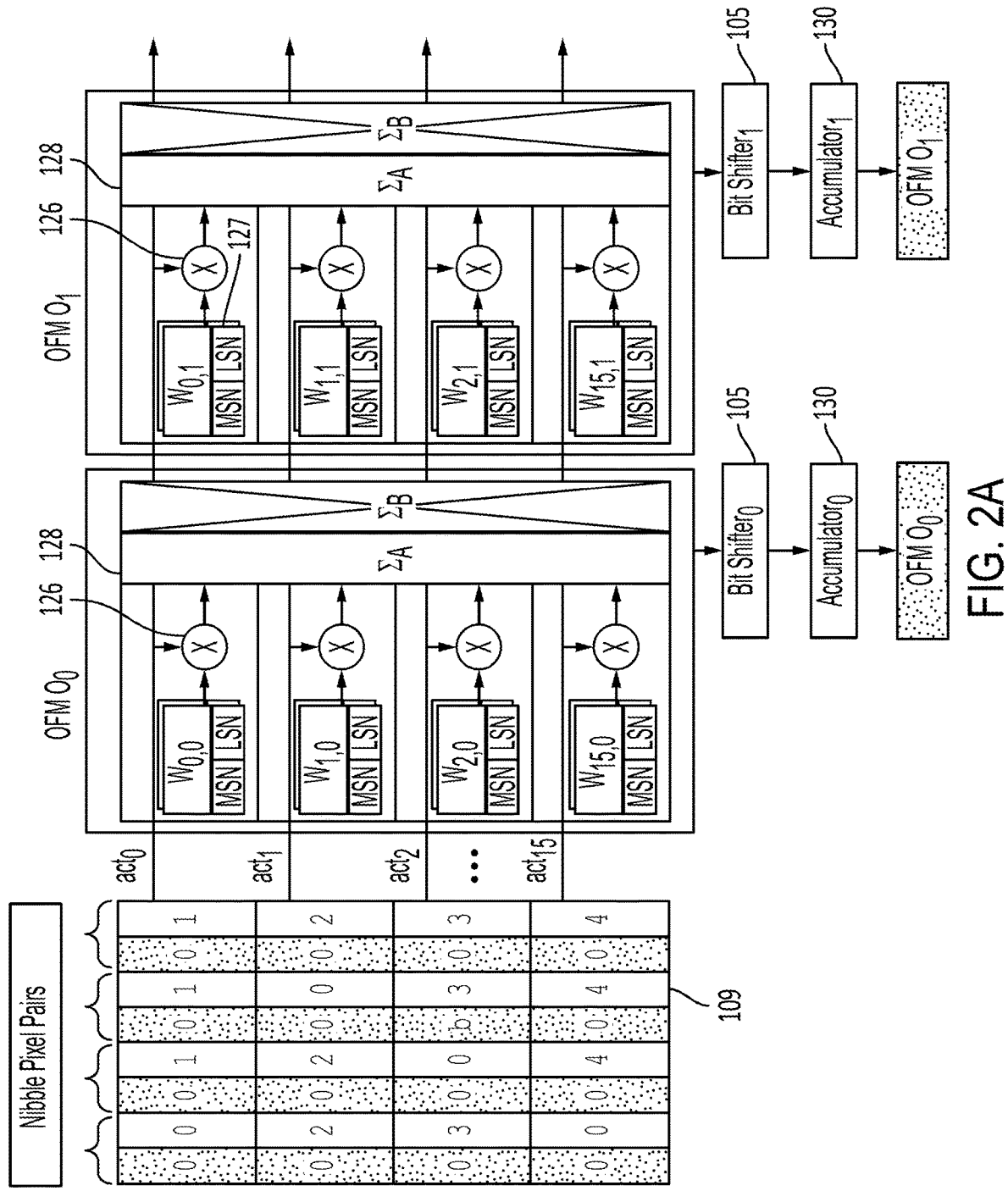
FIG. 2A is a block diagram, according to an embodiment of the present disclosure.

One embodiment is a trivial IFM nibble sparsity tile, shown in FIG. 2A. By using a 4 by 4 multiplier 126, the IFM lanes are nibble-wide. A weight register file 127 may be byte-wide but each byte stored may be treated as two nibbles. As used herein, a "register file" 127 is an array of registers. The embodiment of FIG. 2A differs from the tile disclosed in the '610 Application in that the second adder tree 128 is removed (as indicated by the "X" through the second adder tree 128), as is the IFM look-ahead and look-aside option and weight borrowing from adjacent lanes. As a result, the tile becomes dense and compact, and there is a 12-bit-wide adder tree as an output. Multiplication is skipped if the entire IFM column or slice that will be broadcasted—a 16-nibble-wide lane—consists of all zero values. In this case, the quad IFM cache 139 is look-ahead only. Bit shifters 105 align products of nibbles (e.g., shifting to the left by four bits when one of the factors in a product is a most significant nibble) before they are added.

Figure 2B:
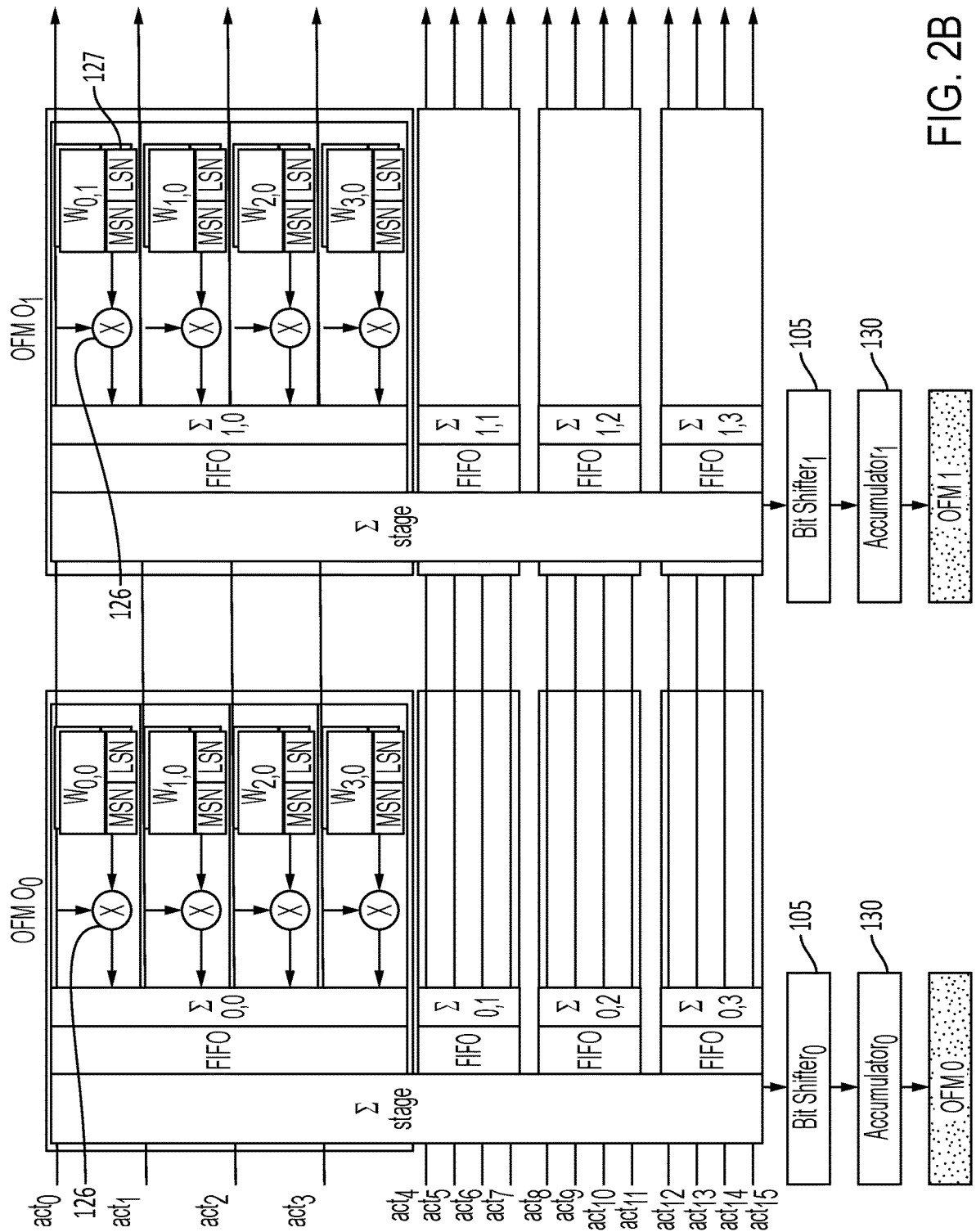
FIG. 2B is a block diagram, according to an embodiment of the present disclosure.

The trivial nibble granularity IFM sparsity tile may be improved to become a trivial quad triple sparsity tile, as shown in FIG. 2B. The probability of all IFM nibbles being zero increases exponentially as the number of IFM lanes decreases. By grouping the lanes into quads, i.e., sets of four lanes, each quad operates independently of other quads. This configuration includes simple weight sparsity. Sixteen lanes are grouped into four quads, each quad includes four lanes. A FIFO is inserted between each quad output and the remaining adder tree 128 to resynchronize quad outputs.

Pipeline registers may be unnecessary when a FIFO is used, and the unused FIFO registers are not clocked, to save power. A partial sum at the quad output is only 10 bits wide, plus a sign bit. The adder tree outputs are upshifted by 0 or multiples of four bits before the accumulator 130. This handles the most- and least-significant IFMs, weight nibbles, and 8- or 16-bit data combinations.

In some circumstances, some quads may run far ahead of other quads, causing an efficiency issue. To prevent this far-ahead running, the weights may be pre-shuffled offline and their corresponding IFM quads may also be (correspondingly) shuffled. The granularity of the shuffling may be entirely quad-based instead of lane-based.

The embodiment of FIG. 2B includes trivial weight sparsity, which skips a quad clock cycle when all weight nibbles in the current cycle are set to zero. The clock cycle is also skipped if all activation-weight nibble pairs are zero.

Figure 2C:
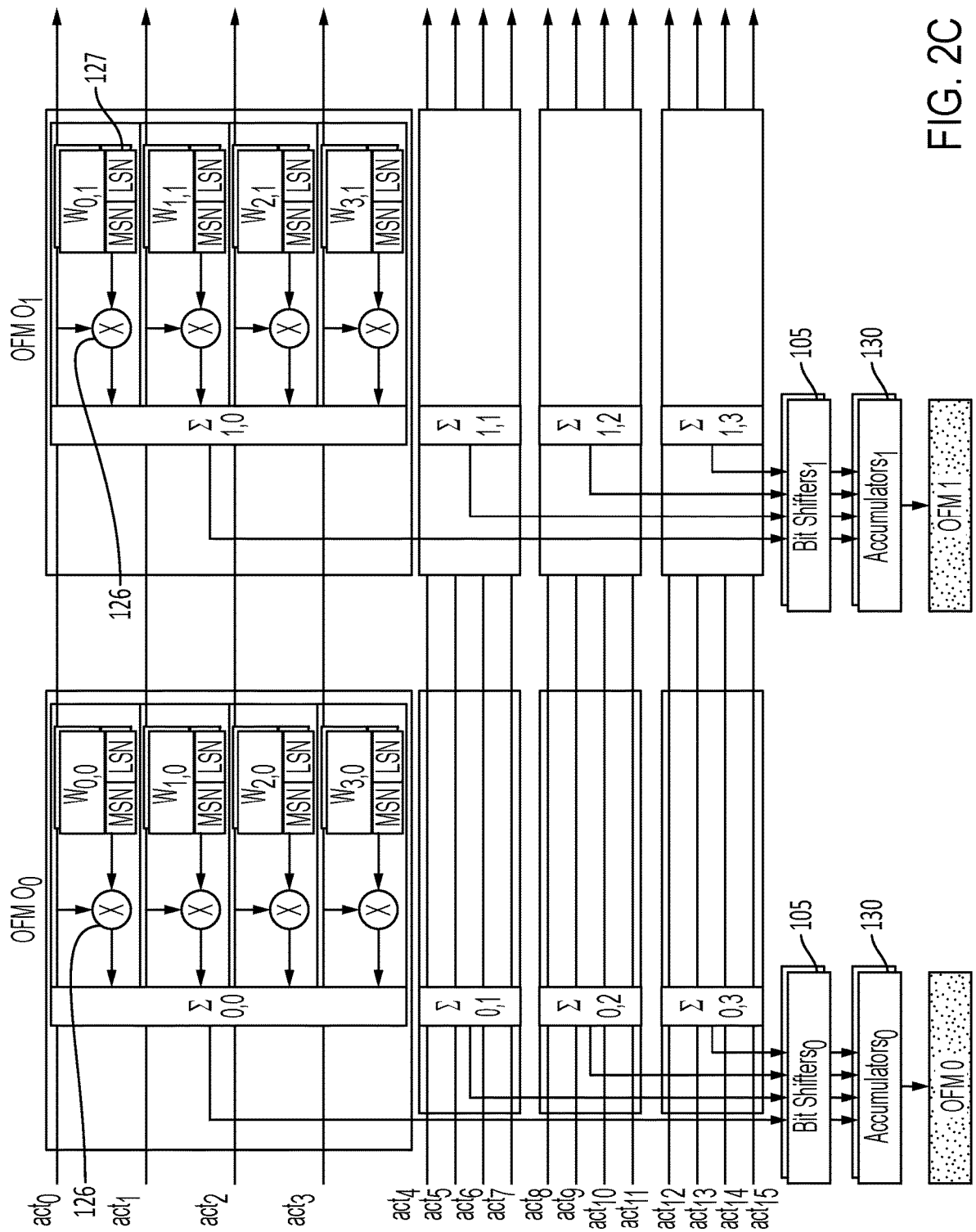
FIG. 2C is a block diagram, according to an embodiment of the present disclosure.

In another embodiment, shown in FIG. 2C, the design of FIG. 2B is modified slightly to exclude the FIFOs. In some cases, FIFOs may be undesirable and then the partial sums are sent from each quad to the output path. The output path has several accumulators 130, to calculate concurrently the several sums corresponding to the partial sums being generated by the quads, some of which may be ahead of others. For example, if a quad is running two clock cycles ahead of other quads, its sum will be added to an accumulator 130 associated with weights that will arrive two clock cycles later. Quad partial sums are only 10 bits and a sign. For one by one convolution, everything can be added to the same accumulator 130.

Figure 2D:
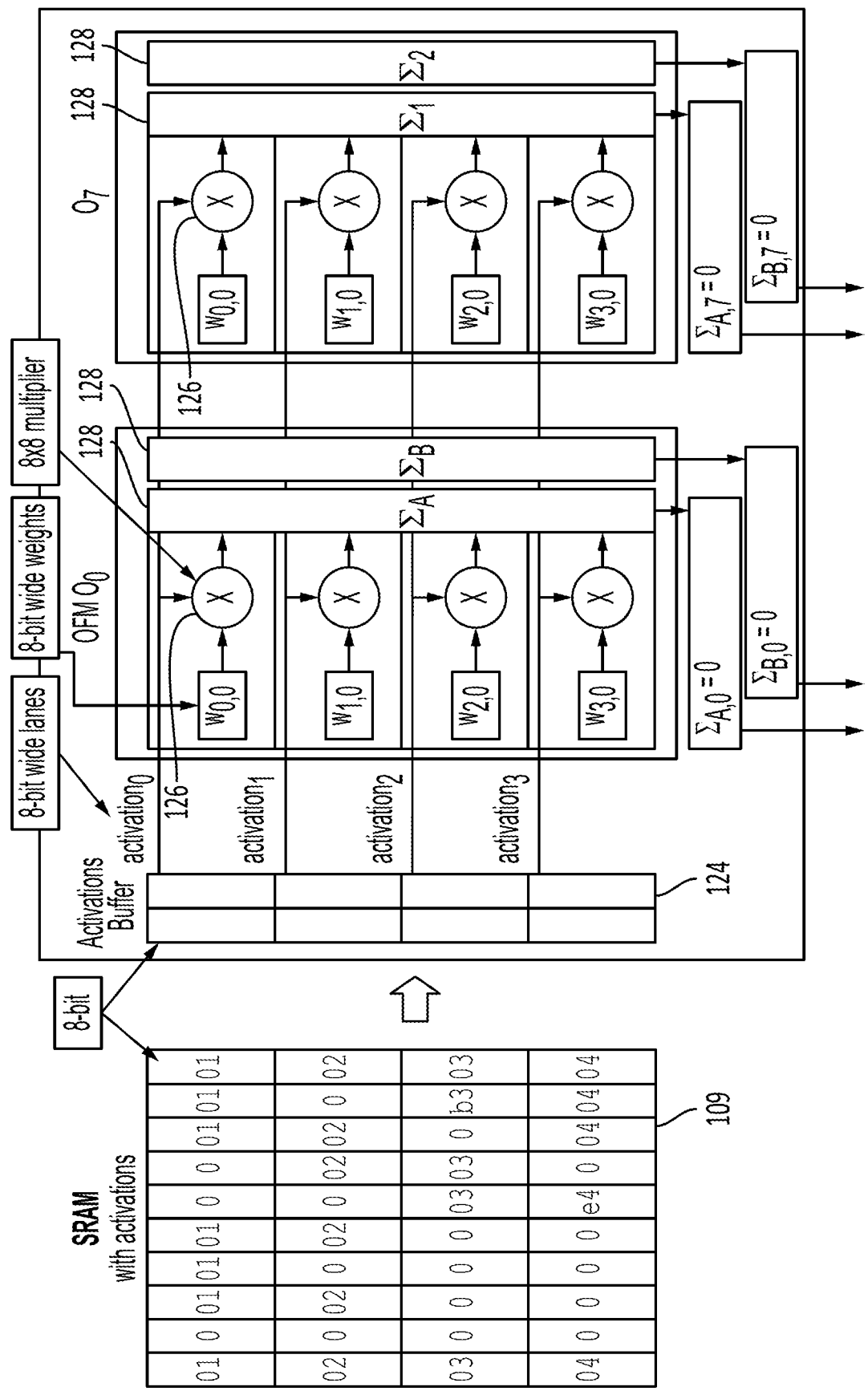
FIG. 2D is a block diagram, according to an embodiment of the present disclosure.

FIG. 2D shows an embodiment implementing trivial activation sparsity, which is capable of taking advantage of multiples of 4-bit sparse activations. FIG. 2D shows an 8-bit vector-matrix multiplier 126 with 8-bit IFM sparsity support.

FIG. 2D is modified by splitting the 8-bit activation into two separate, consecutive 4-bit sparse IFM pixels (which may together be referred to as a "nibble pixel pair"), i.e., each 8-bit IFM pixel may be represented as a nibble pixel pair. The operation is the same as in the 8-bit IFM sparsity case of the '610 application; however, the multiplier 126 is a 4-bit IFM by an 8-bit weight and there are two consecutive pixels in the column accumulator 130.

Figure 2E:
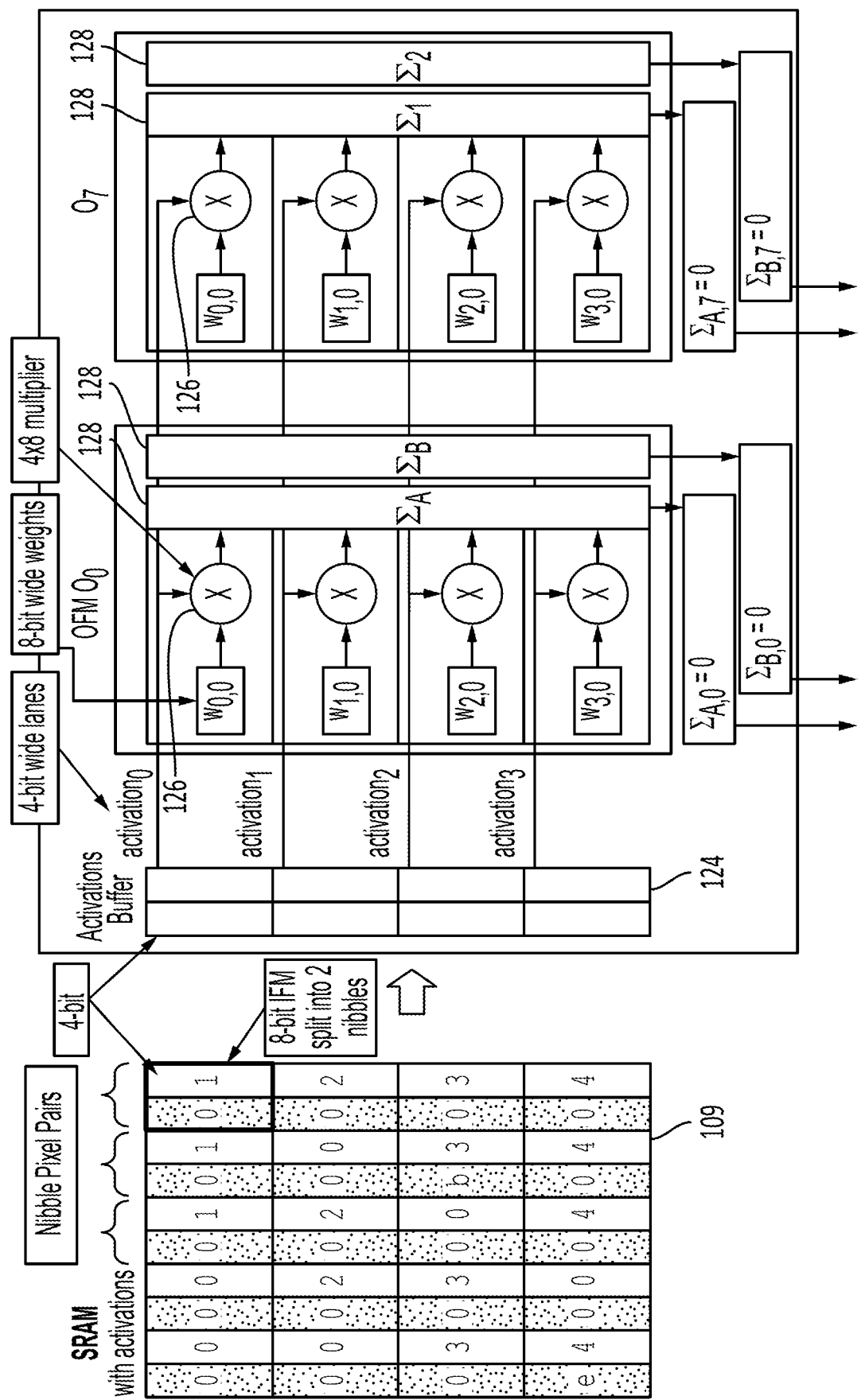
FIG. 2E is a block diagram, according to an embodiment of the present disclosure.

FIG. 2E shows a multiplication unit with a 4-bit by 4-bit multiplier. Each 8-bit activation may be split into 2 separate, consecutive 4-bit sparse IFM "pixels" (nibble pixel pairs). The disclosed system may then proceed as in the 8-bit IFM sparsity case of the '610 application, except that the multiplier 126 is 4-bit IFM x 8-bit weight multiplier, and the 2 consecutive nibble products may be added in the column accumulator 130. Products coming from same nibble pixel pair may be added in the same adder tree 128.

Figure 2F:
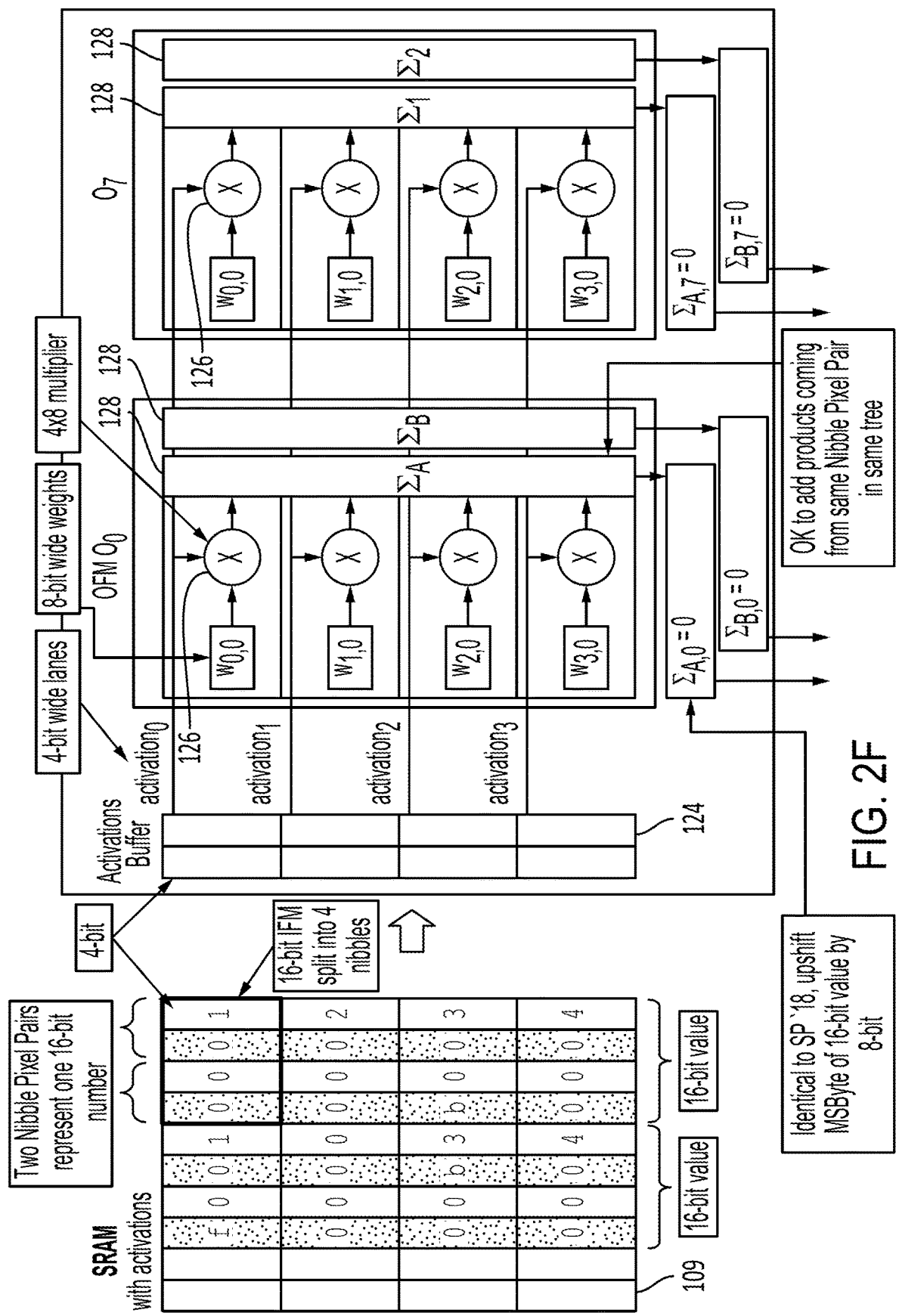
FIG. 2F is a block diagram, according to an embodiment of the present disclosure.

In another embodiment shown in FIG. 2F, the trivial activation sparsity works on a 16-bit activation decomposed into two 8-bit sparse pixels. Two nibble pixel pairs represent one 16-bit number. By splitting the 16-bit activation into two separate, consecutive 8-bit sparse IFM pixels, where each nibble pixel pair is one 8-bit sparse IFM pixel, the system is able to process a 16 bit IFM. There are n 4-bit pixels for each 4n-bit IFM element. Next, each nibble pixel pair is split into two 4-bit sparse IFMs. The disclosed system may then proceed as in the 8-bit IFM sparsity case of the '610 application; however, the multiplier in the embodiment of FIG. 2F is a 4-bit IFM by an 8-bit weight. N consecutive pixels are added in the column accumulator 130. Once the 16-bit values are decomposed into two nibble pixel pairs, each of the two resulting 8-bit activations is again split, forming four separate, consecutive 4-bit sparse IFM pixels, known as a nibble pixel quad. This is for a 16-bit IFM. There are three 4-bit pixels for a 12-bit IFM, and n 4-bit pixels for a 4n-bit IFM.

Figure 2G:
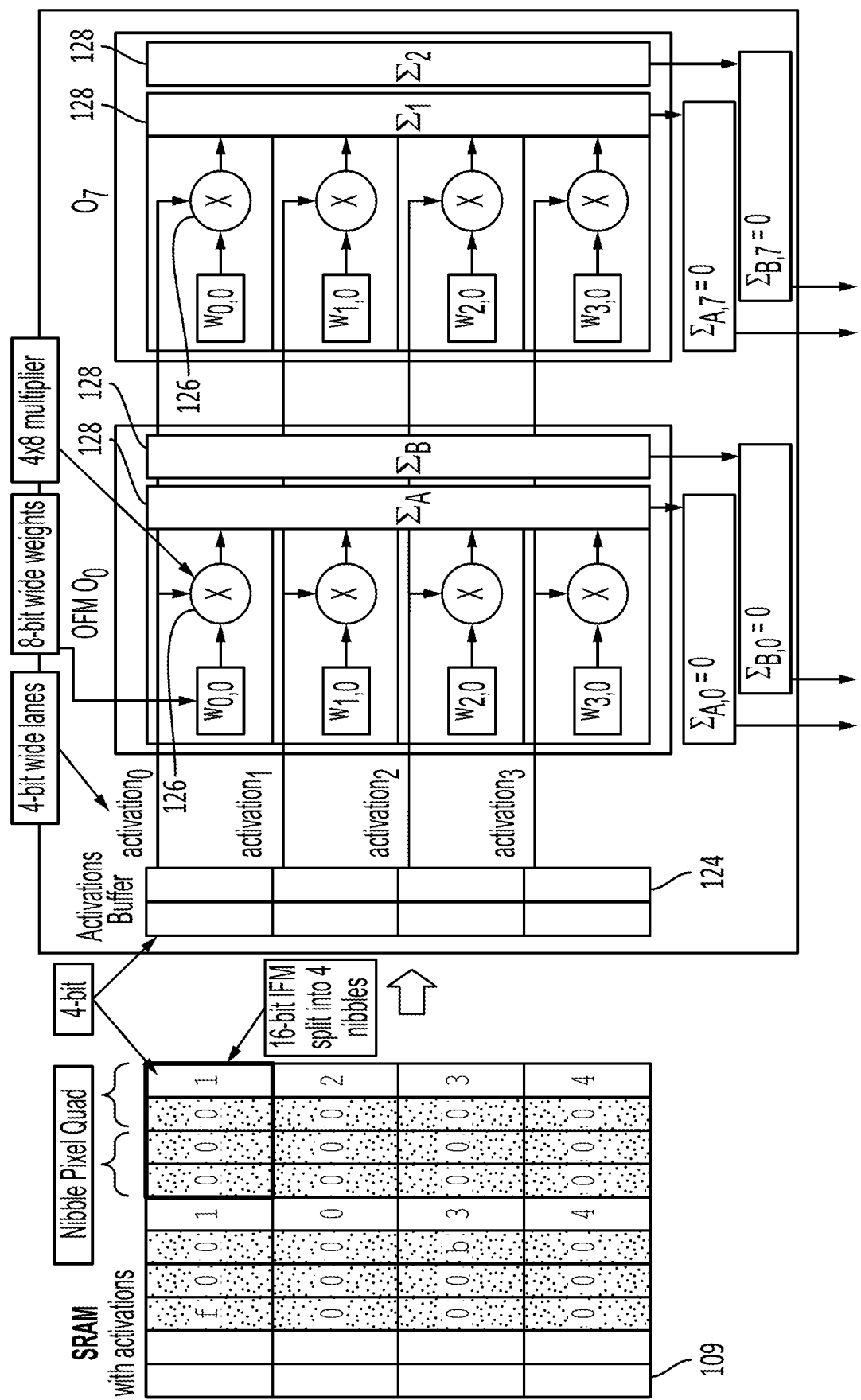
FIG. 2G is a block diagram, according to an embodiment of the present disclosure.

In some embodiments, instead of splitting a 16-bit IFM value into two 8-bit values and then (recursively) splitting each of the two 8-bit values into two 4-bit nibbles, a 16-bit IFM value may be directly (non-recursively) split into four 4-bit nibbles, as in the embodiment of FIG. 2G.

FIG. 2G shows how (i) a 16-bit activation may be split into 4 separate, consecutive 4-bit sparse IFM "pixels" (forming a nibble pixel quad) for a 16-bit IFM; (ii) the activation may be split into three 4-bit nibbles for a 12-bit IFM; and (iii) the activation may be split into n 4-bit nibbles for a 4n-bit IFM (not recursively). The system may then proceed as in the 8-bit IFM sparsity case of the '610 application, except that the multiplier 126 in the embodiment of FIG. 2G is 4-bit IFM x 8-bit weight multiplier. The n consecutive pixels may be added in the column accumulator 130 (resulting in fewer stalls); wider (4-bitx16-bit) adder trees 128 may be used.

The table of FIG. 2H summarizes the operations that may be performed with this adder tree width (4-bitx16-bit) with a 4-bit by 4-bit multiplier 126 for various sparse IFM pixels.

For FP4.x-bit activations (where "FP4.x" means a floating point representation with a 4-bit mantissa and an x-bit exponent), the IFM broadcast lane is a 4-bit unsigned lane and a 1-bit signed lane. Most weights are 4 bits in length, but not all. To increase utilization, the FP4.x format may be used. Some IFM values can be represented without accuracy loss; for example an 8-bit value having a most significant nibble of 0001 and a least significant nibble of 0010 may be represented as 0000 and 1001 e-1. Such values may be capable of being multiplied by a 4-bit fixed multiplier and the multiplier output may then be shifted up by an exponent number of bits. When using FP4.1 instead of FP4.2+(i.e., FP4.x, with x>1), due to the IFM distribution, adding one exponent broadcast bit line may provide the best improvement per added broadcast bit line with the least overhead (in terms of the number of multiplexers used). Using an FP4.x representation adds 2^x bits to the adder tree width.

FP4.x-bit weights may be used to increase 4-bit multiplies. As a weight is fetched from the register file 127, eligible 8-bit weights are converted to FP4.1+. This is similar to FP4.1 for IFM broadcast lanes. There is lower hardware overhead for FP4.1 and it adds 2^x bits to the adder tree width.

Figure 3A:
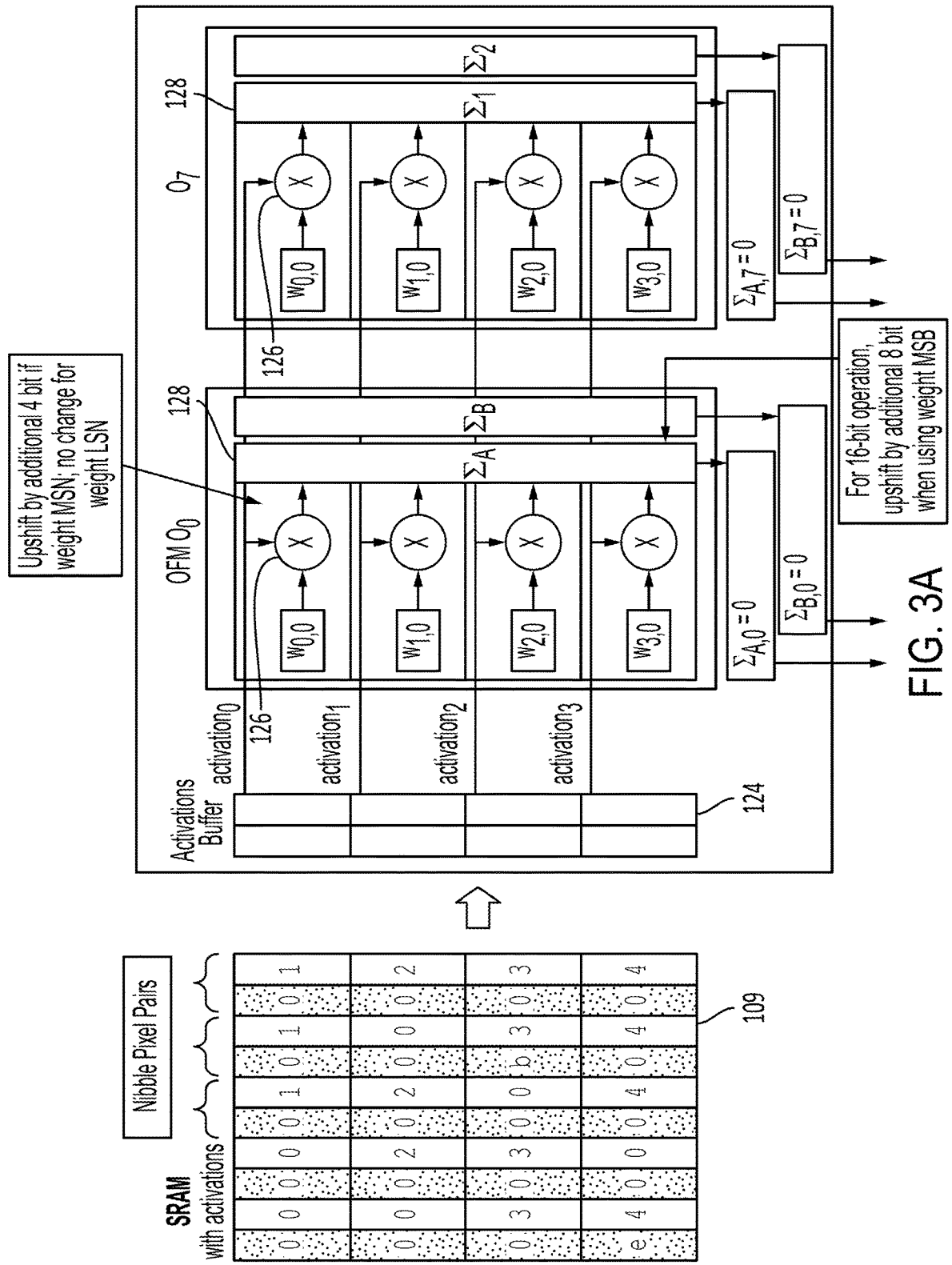
FIG. 3A is a block diagram, according to an embodiment of the present disclosure.

In another embodiment, the 4-bit vector matrix multiplier has 8-bit IFM sparsity support. Referring to FIG. 3A, each weight register may store a sign bit and an 8-bit value that is accessible one nibble at a time, and fed to the multiplier 126 one nibble at a time. Each multiplier 126 may take up to two cycles to multiply each IFM nibble by two weight nibbles (one at a time). The output of the multiplier 126 may be (i) upshifted by an additional four bits if the weight nibble is the most significant nibble (MSN), and (ii) not shifted if the weight nibble is the least significant nibble (LSN).

Figure 3B:
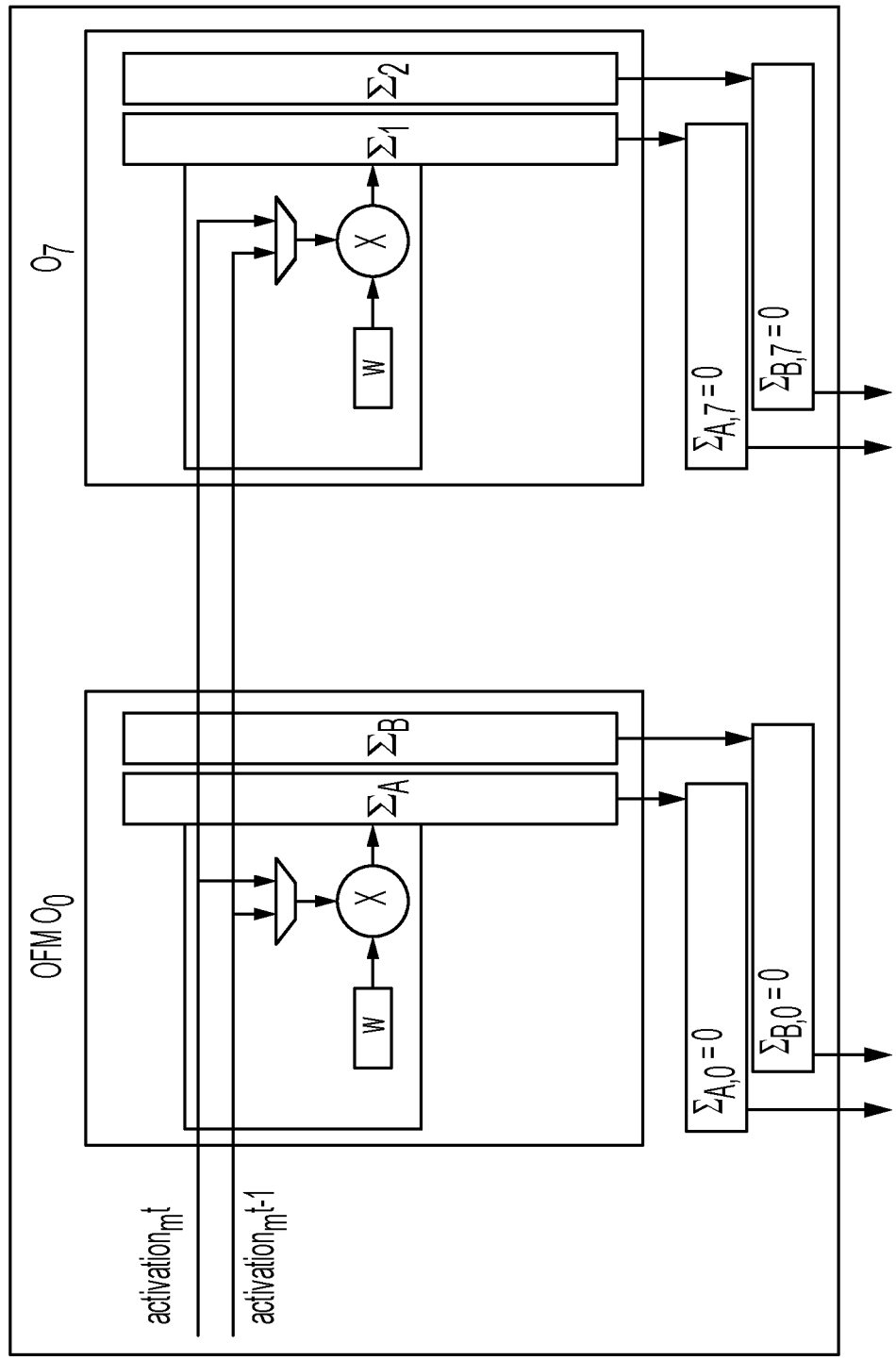
FIG. 3B is a block diagram, according to an embodiment of the present disclosure.

In another embodiment, the system includes duplicate broadcast lanes which increase utilization, as shown in FIG. 3B. The duplicate broadcast lanes replicate each activation broadcast lane. For high utilization, the lanes may be 2x or Nx, with N>2. The lanes flip-flop between one and the other to provide multiplication units with 2 or more activation choices, at clock cycle t, clock cycle t-1, and so on. This embodiment may use additional adder trees 128.

Figure 3C:
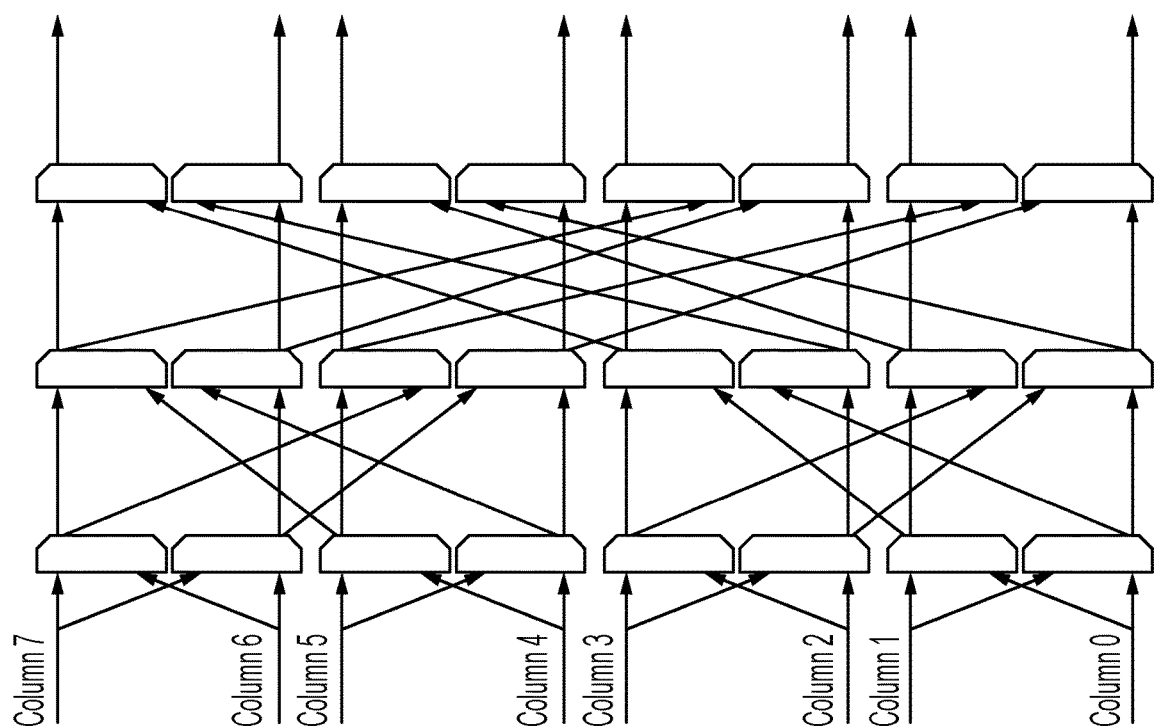
FIG. 3C is a block diagram, according to an embodiment of the present disclosure.

Weight sparsity is one part of triple sparsity and is described below. It includes work borrowing, sparse weight pairing for single and multiple columns, and cheap (i.e., requiring little chip space) per-column shufflers. "Work borrowing", as used herein, means one multiplication unit (MU) borrowing work from another. A shuffler may be used between the IFM cache 139 and the activations buffer 124 to increase opportunities for work borrowing. The shuffled IFM broadcast lanes may be such that each nonzero nibble, typically an MSN, has adjacent multiplication units with zero nibbles, also usually MSNs. When these are adjacent within a column, a work-sharing design is particularly simple. When fetching an 8-bit weight, it is equivalent to two 4-bit nibble weights. One of the two nibble weights can easily be borrowed in the same IFM weight cycle. A butterfly shuffler, such as the butterfly shuffler illustrated in FIG. 3C, may be used.

Figure 3D:
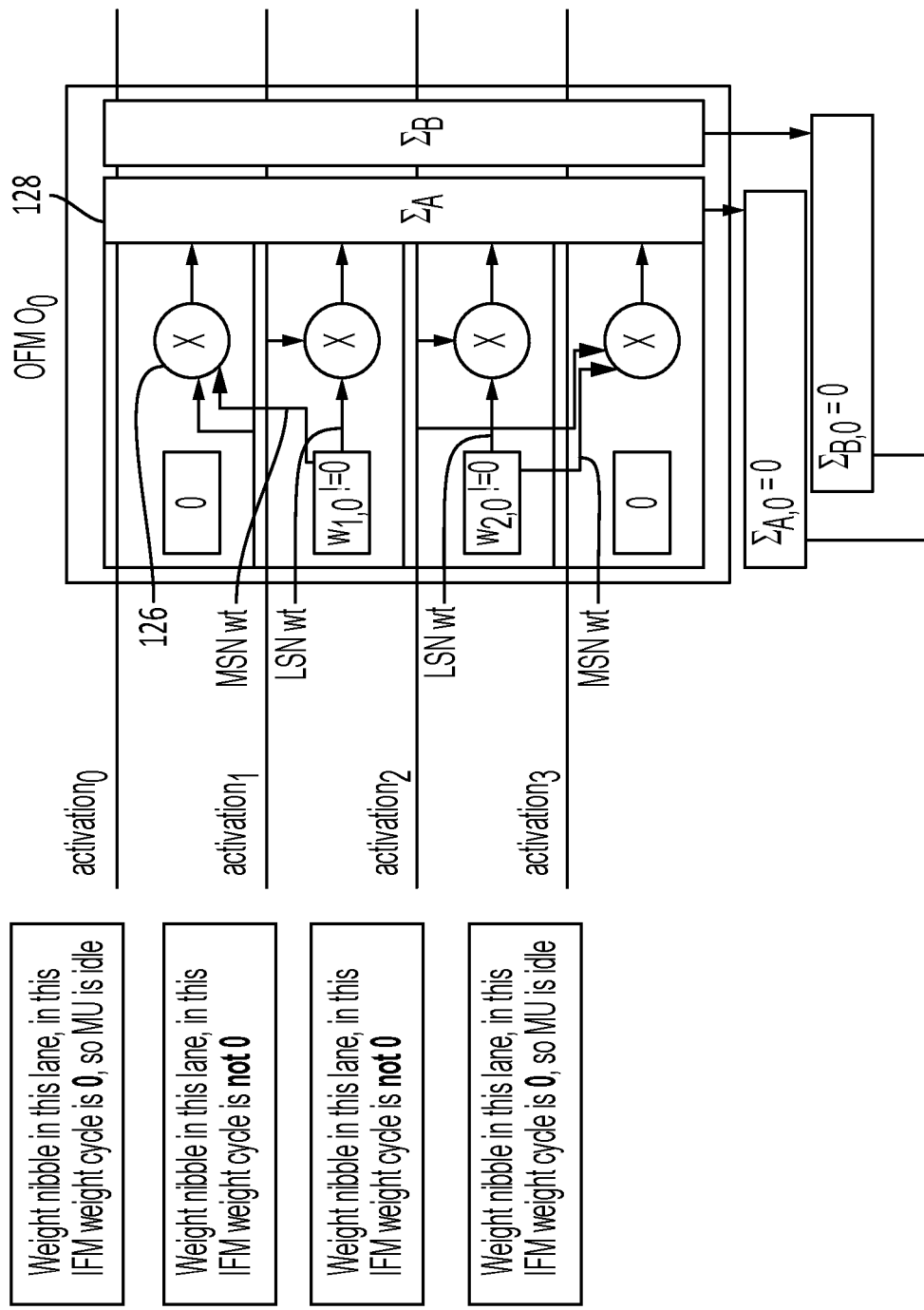
FIG. 3D is a block diagram, according to an embodiment of the present disclosure.

In another embodiment, work is borrowed by one multiplier 126 from another one that is adjacent to it in a 2 by 2 multiplication unit sharing sense, as shown in FIG. 3D. Using two adjacent multiplication units to perform a 4-bit IFM by an 8-bit weight multiplication as two 4-bit IFM by 4-bit weight multiplications allows for using two adjacent multiplication units. An idle MU borrows weight activation pairs from an adjacent MU. Using the MUs in the same column is simpler because these share the same adder trees 128. When MU columns are ganged together—adjacent columns are in pairs—the same-ganged column pair MUs are used because they share the same adder tree 128.

Figure 3E:
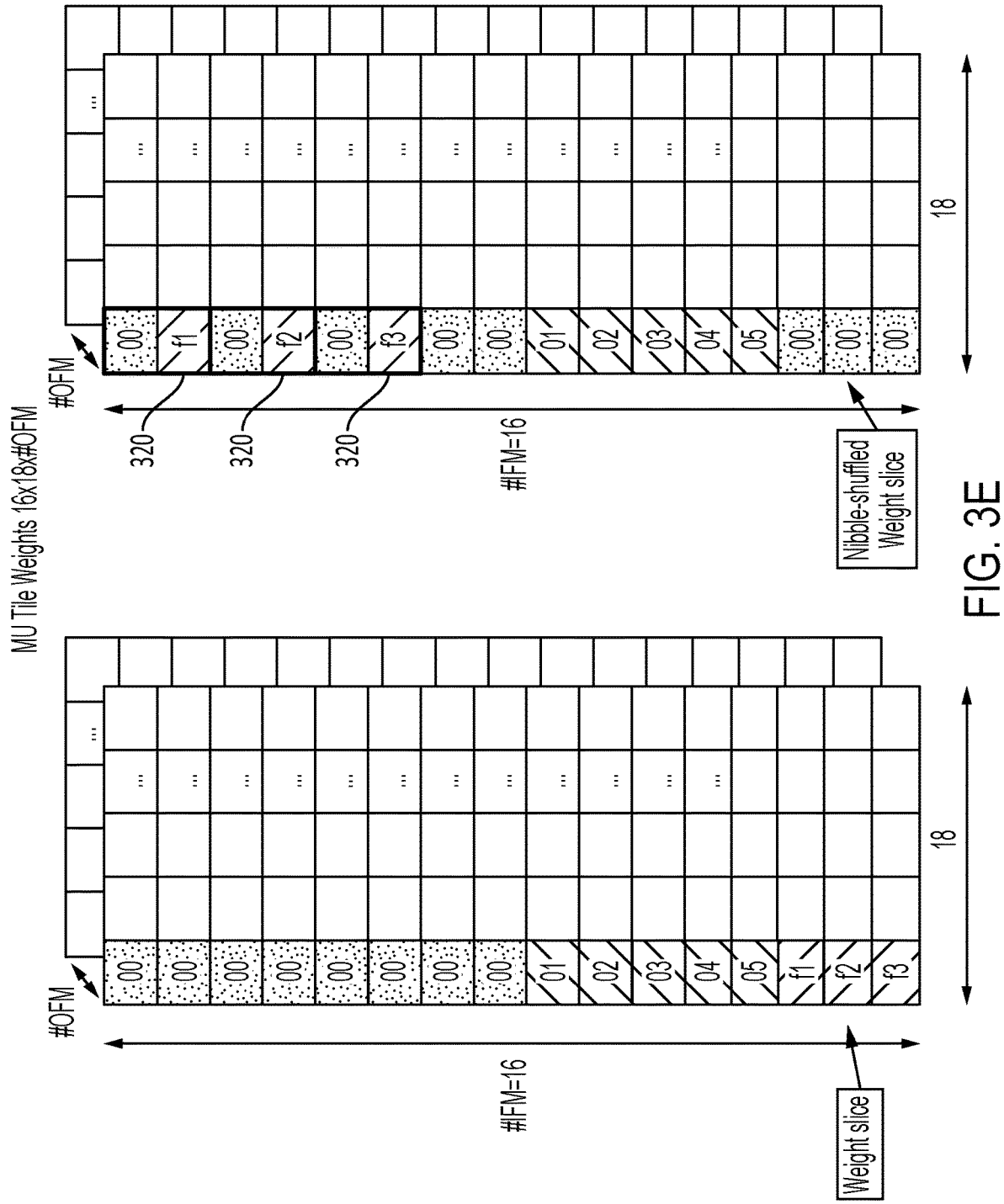
FIG. 3E is a data layout diagram, according to an embodiment of the present disclosure.
Figure 3F:
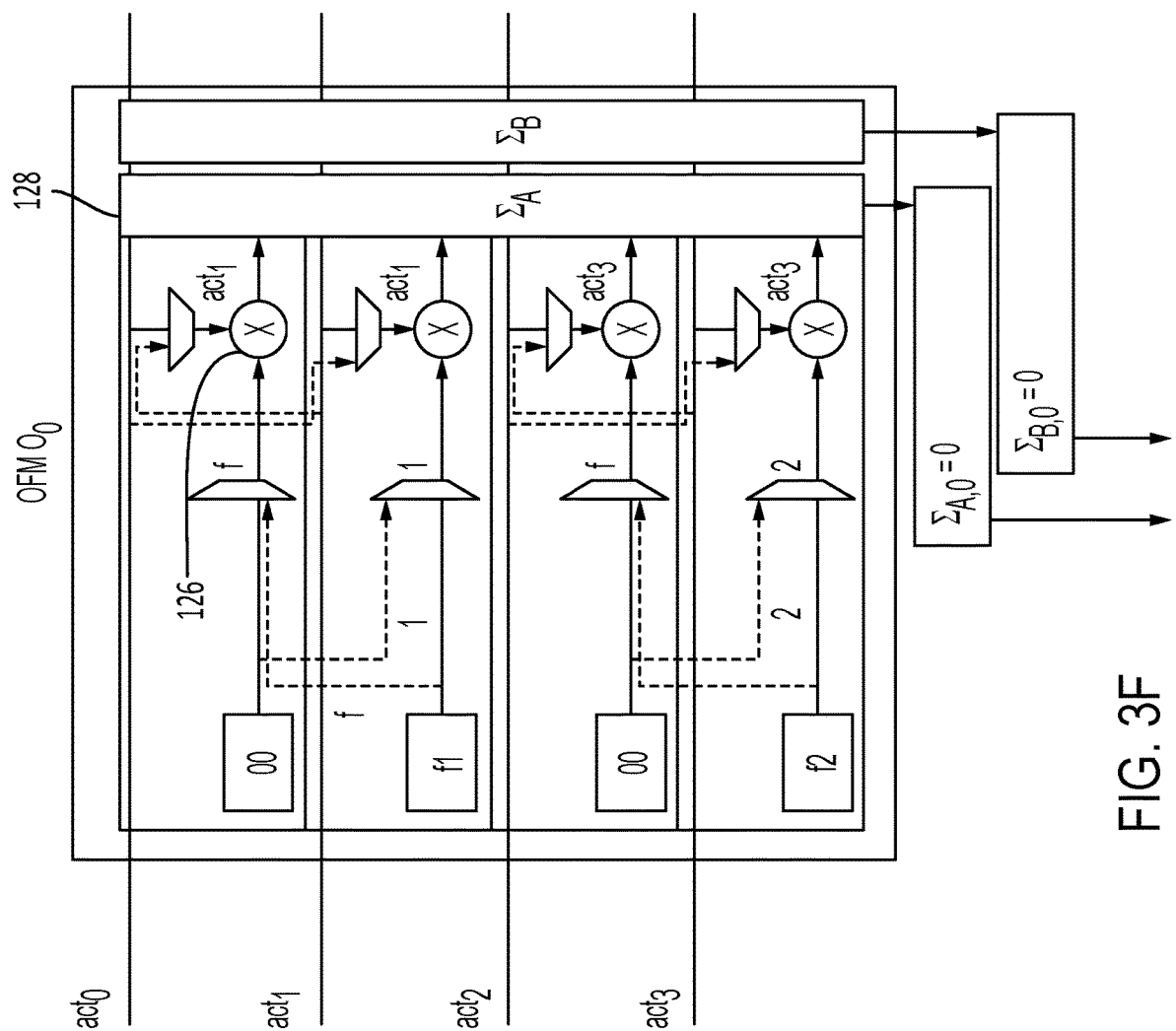
FIG. 3F is a circuit diagram, according to an embodiment of the present disclosure.

In sparse weight pairing, the pairs of weights that are sparse are paired together. For example, as shown in FIG. 3E, if for a set of 16 weights, 8 are zero, 5 are 4-bit, and 3 are 8-bit, these weights may be paired. Activation lanes are reshuffled to pair the 8-bit zero weights with 8-bit nonzero weights. The weights are shuffled offline. They may also be shuffled with a butterfly IFM shuffler as discussed above. The result is a zero-and-nonzero (ZNZ) 8-bit weight pair or pairs 320. Each ZNZ pair 320 has a zero-holding MU. This zero-holding MU borrows a nibble from the 8-bit holding MU, resulting in the 8-bit multiplication being completed in one cycle. Nibble borrowing, may be performed, for example, using the circuit of FIG. 3F. Because weights are stored as 8 bits, the overhead is two 4-bit muxes per MU.

Figure 3G:
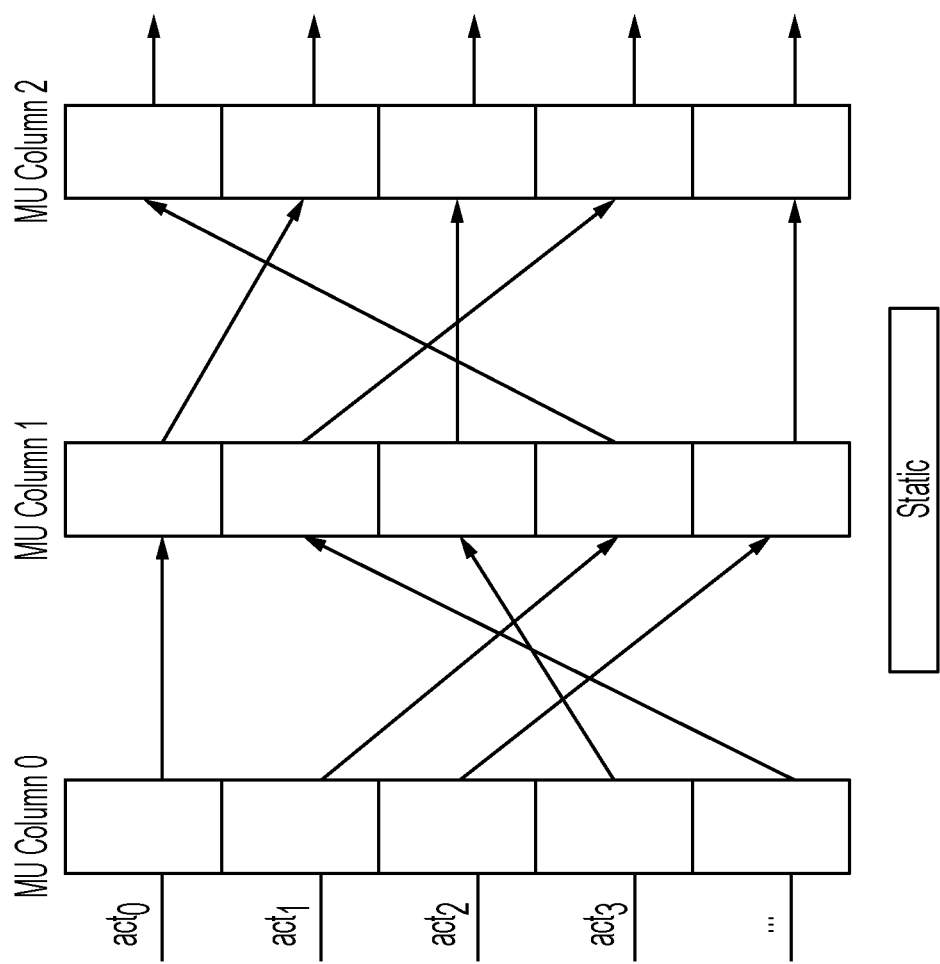
FIG. 3G is a data flow diagram, according to an embodiment of the present disclosure.

Sparse weight pairing may be expanded to multiple columns, as illustrated in FIG. 3G. Storing nibble weights, shuffling lanes, and adding nibbles at any two MUs is possible for nibbles in the same column. Borrowing nibbles can be from left, right, above, below, or diagonally in certain cases. When MUs share adder trees 128 this is more beneficial. A shuffler may be present between every pair of columns, since the distribution of sparsity in the weights of the different column will in general not be the same. Using a simplified shuffler, the adjacent lanes can be swizzled (e.g., shuffled in a random or pseudorandom manner, using a static shuffler), e.g., by running wires between lanes. Columns can be shuffled, which places idle MUs to the left or right of busy MUs. FP4.x with x values larger than 1 may be used; this may provide a better representation for weights that are normally distributed, and among which there may therefore be a relatively high proportion of weights having one effective nibble. Weights may also be pruned offline.

Figure 3H:
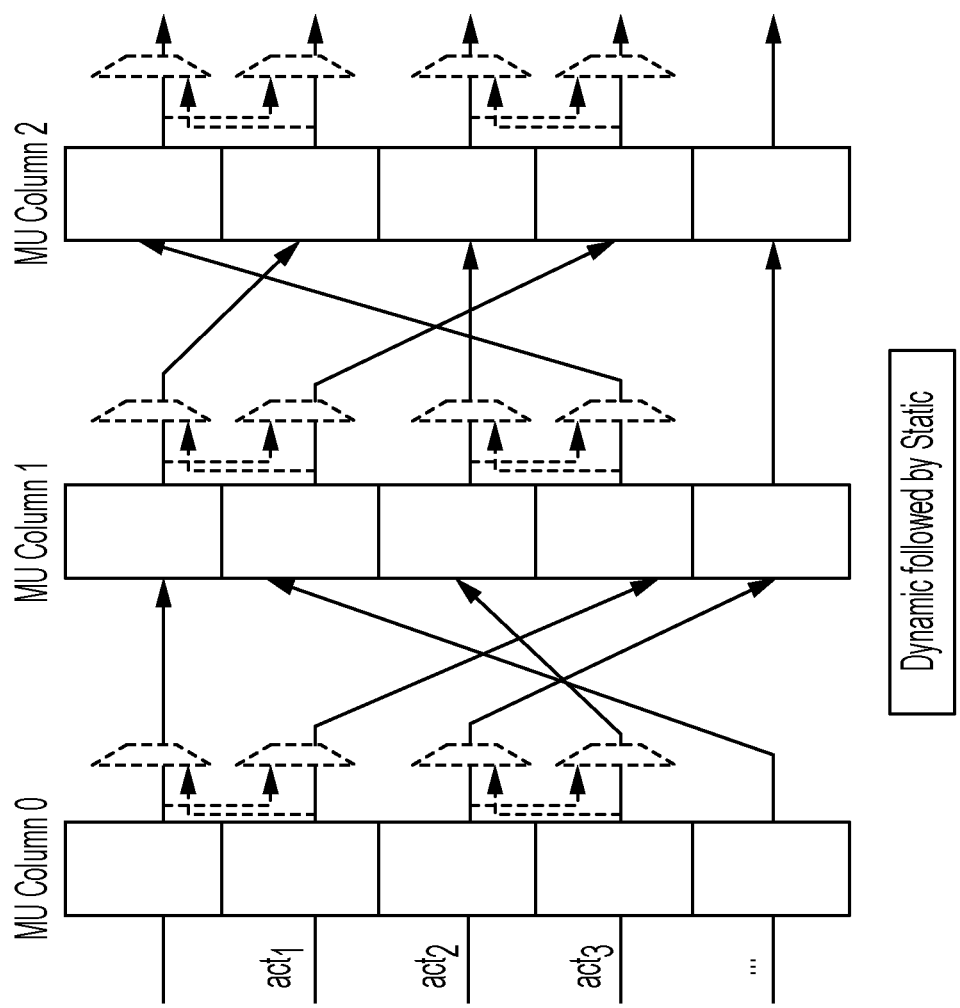
FIG. 3H is an architecture diagram, according to an embodiment of the present disclosure.
Figure 3I:
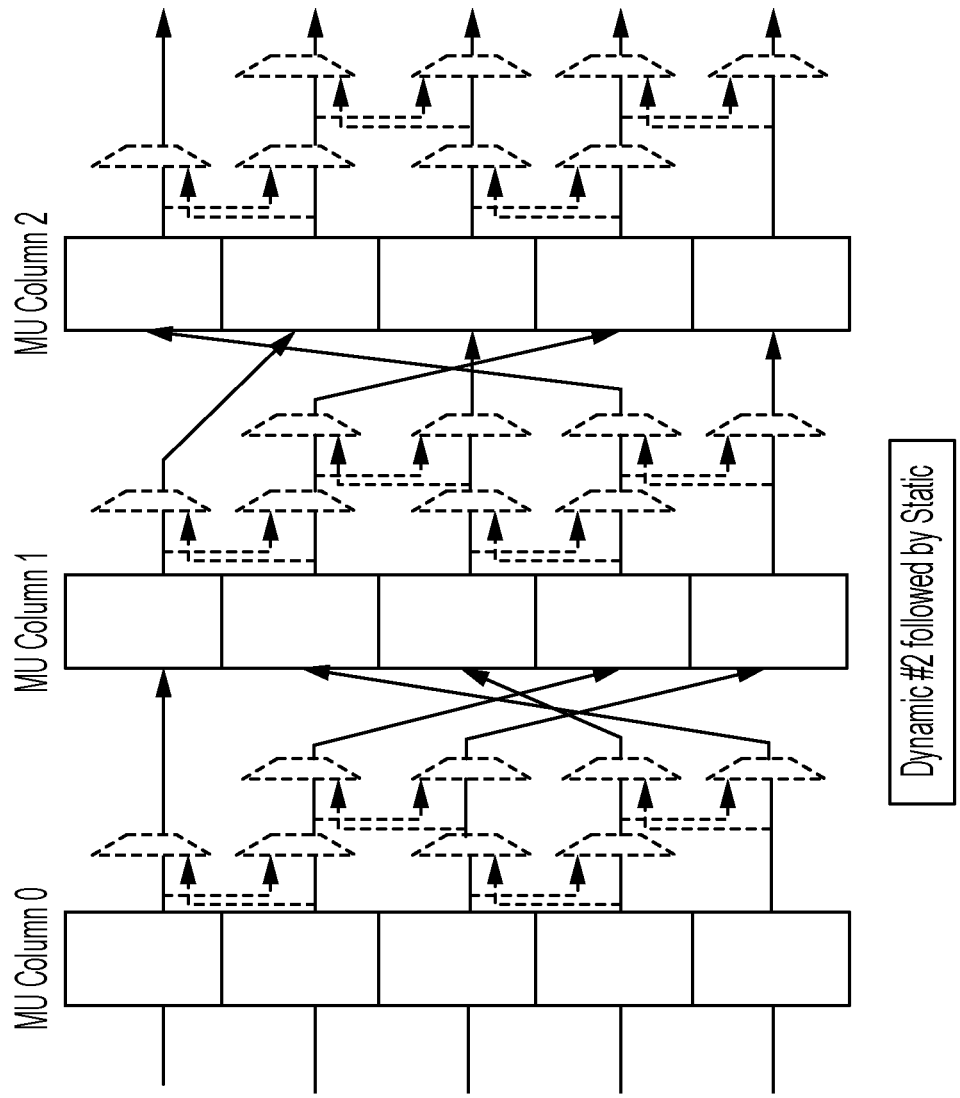
FIG. 3I is an architecture diagram, according to an embodiment of the present disclosure.

FIG. 3G shows a data flow diagram for a set of column shufflers. FIGS. 3H and 3I show column shuffler architectures, in two respective embodiments. In some embodiments, a bit-tactical per-column shuffler may be included.

Figure 4A:
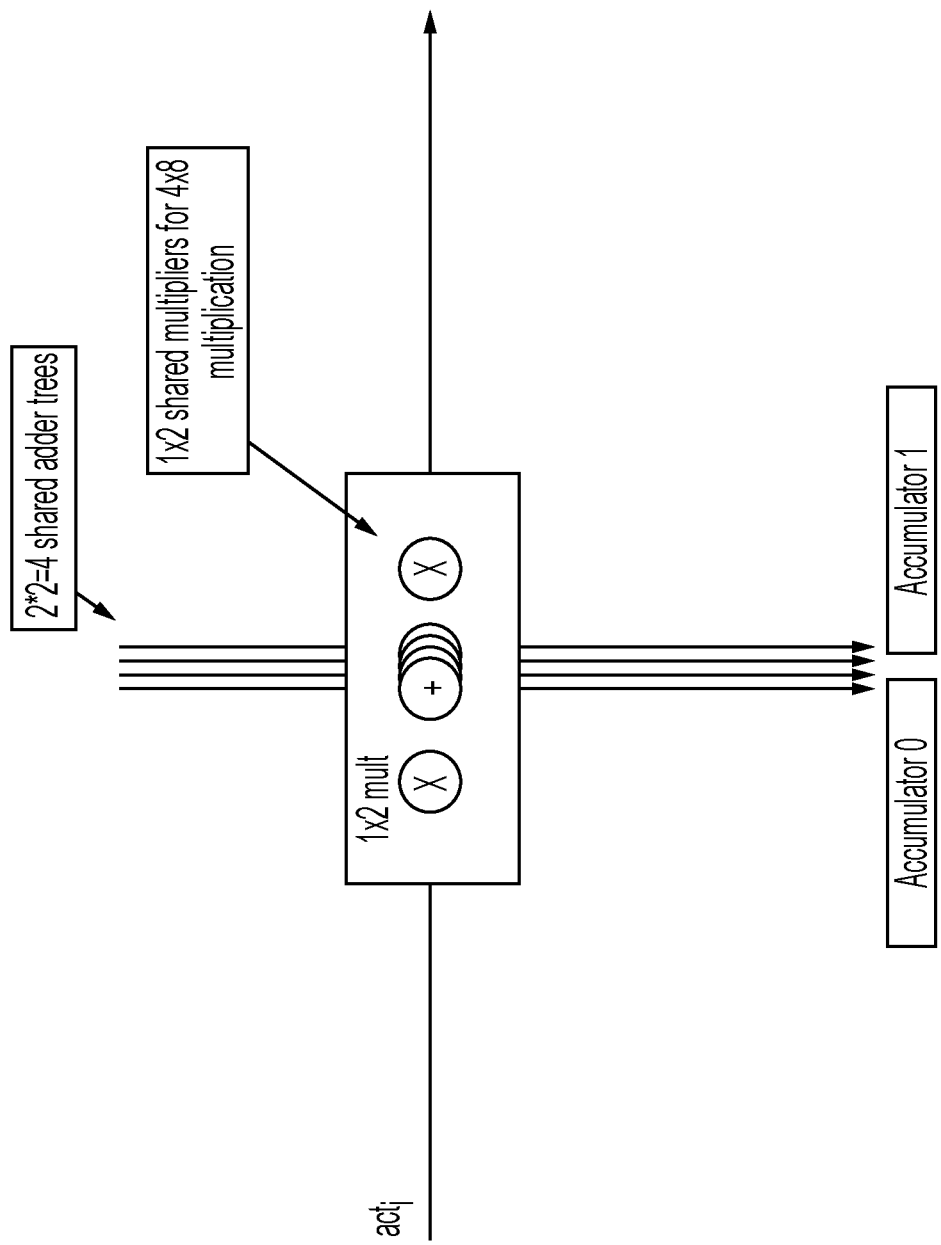
FIG. 4A is a block diagram, according to an embodiment of the present disclosure.
Figure 4B:
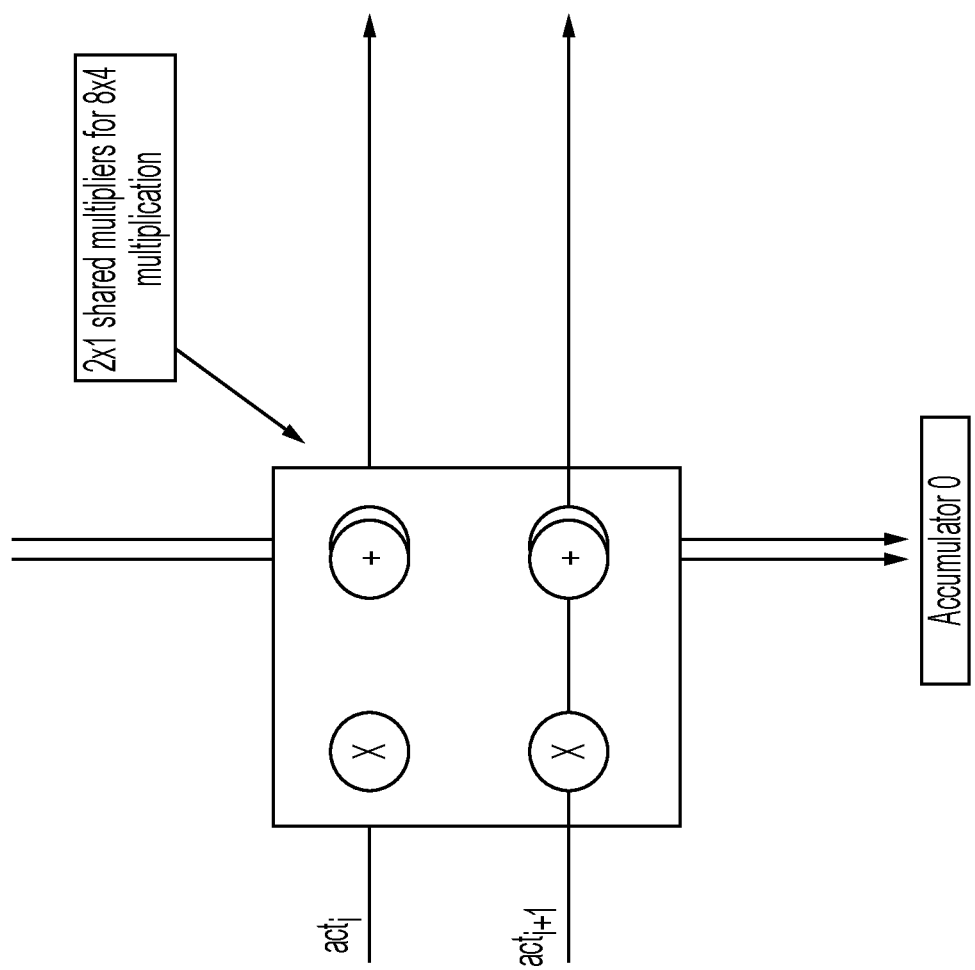
FIG. 4B is a block diagram, according to an embodiment of the present disclosure.
Figure 4C:
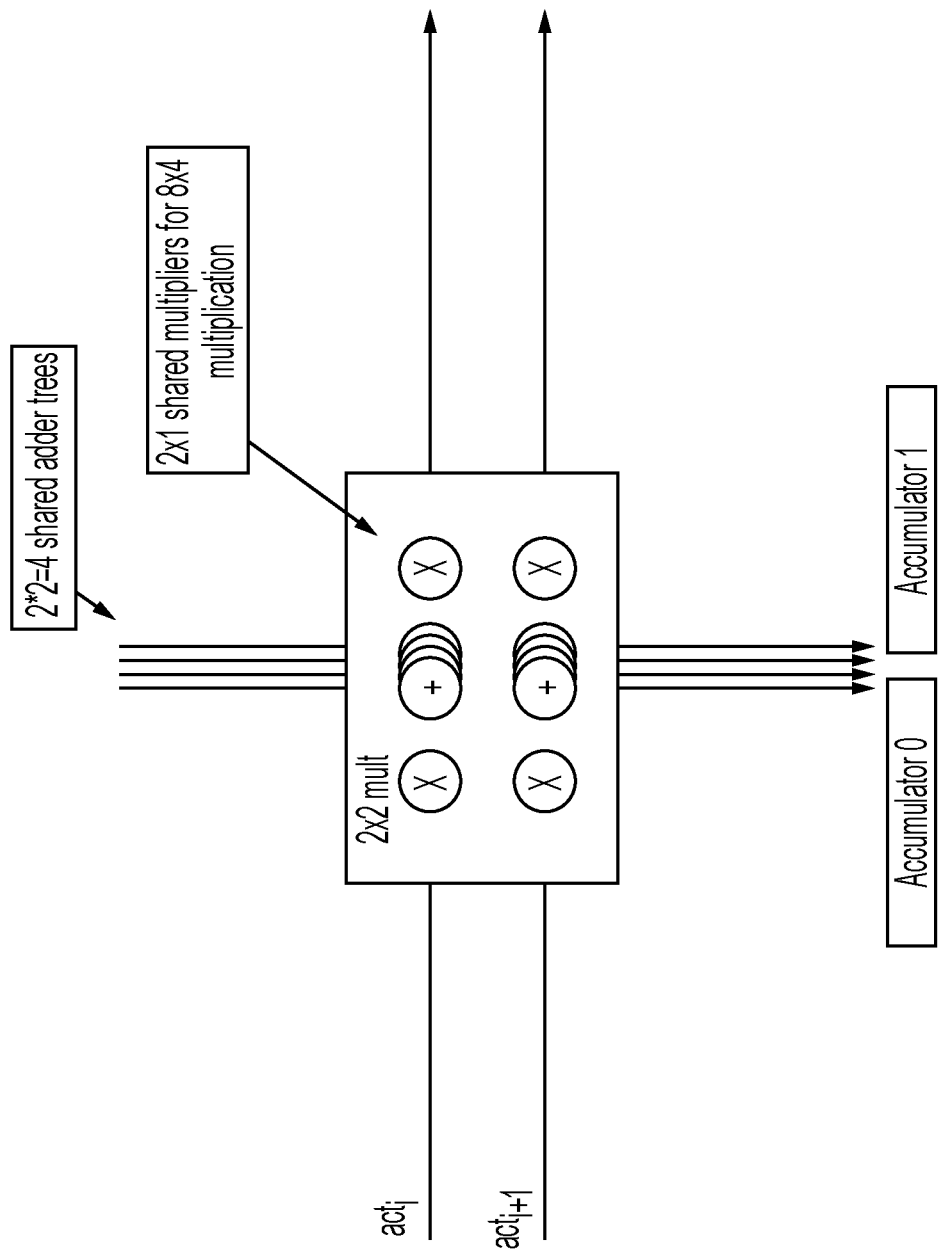
FIG. 4C is a block diagram, according to an embodiment of the present disclosure.

In some embodiments the system may be configured to perform dense computation. Examples of dense computation may include dense (i.e., non-sparse) 8-bit weights, 8-bit IFMs, and the combination of the two. When dense 8-bit weights are present, multi-cycle processing may be avoided by ganging columns into pairs horizontally to perform a 4-bit by 8-bit multiplication, as shown in FIG. 4A, reducing the overall number of OFM channels. When dense 8-bit IFMs are present, the columns may be ganged into pairs vertically, as shown in FIG. 4B, and an 8-bit by 4-bit multiplication may be performed. Combined dense 8-bit IFMs and weights may be processed by ganging together columns in quads vertically and performing 8-bit by 8-bit multiplications with sufficiently-wide adder trees 128, as shown in FIG. 4C.

Figure 5A:
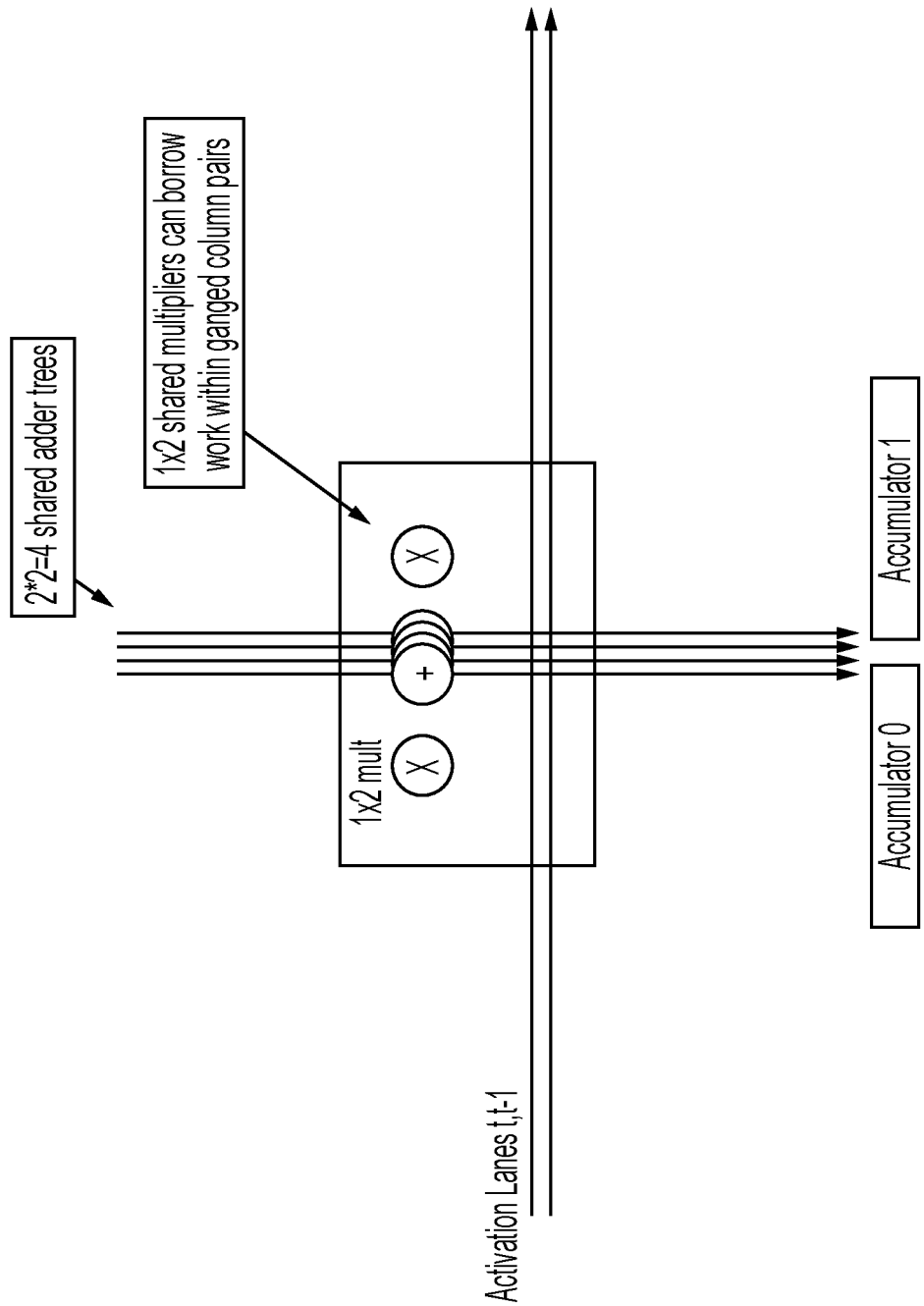
FIG. 5A is a block diagram, according to an embodiment of the present disclosure.

In some embodiments, the MAC overhead may be reduced by sharing adder trees 128, weight register files 127, or 2 by 2 MU resources, as discussed in further detail below, in the context of FIG. 5A-FIG. 5C. Referring to FIG. 5A, some of the designs described above for taking advantage of IFM sparsity, such as replicated activation lanes, may require more adder trees 128. Some of these adder trees 128 may be underutilized, and, therefore, columns may be ganged together to share adder trees 128. For example, 1 by 2 multipliers may be ganged together to share four adder trees 128.

Referring to FIG. 5B, in some embodiments the MAC overhead may be reduced by storing weights in sparse form and sharing weight register files 127. In one embodiment, columns are ganged together to share weight registers. Nonzero 8-bit weights are stored and an additional weight bit mask register (having one bit per register) is added to mark all zero 8-bit registers. The weight kernel size is effectively increased both by storing nonzero weights only and by using weights from columns that have fewer nonzero weights. In such an embodiment, the ganged column pairs act as two virtual columns per one physical column. For example, two physical channels or one physical channel can be used with double the weight width multipliers. Another example is to gang 4 by 4 multipliers into 4 by 8 multipliers, creating an 8-bit weight.

Figure 5C:
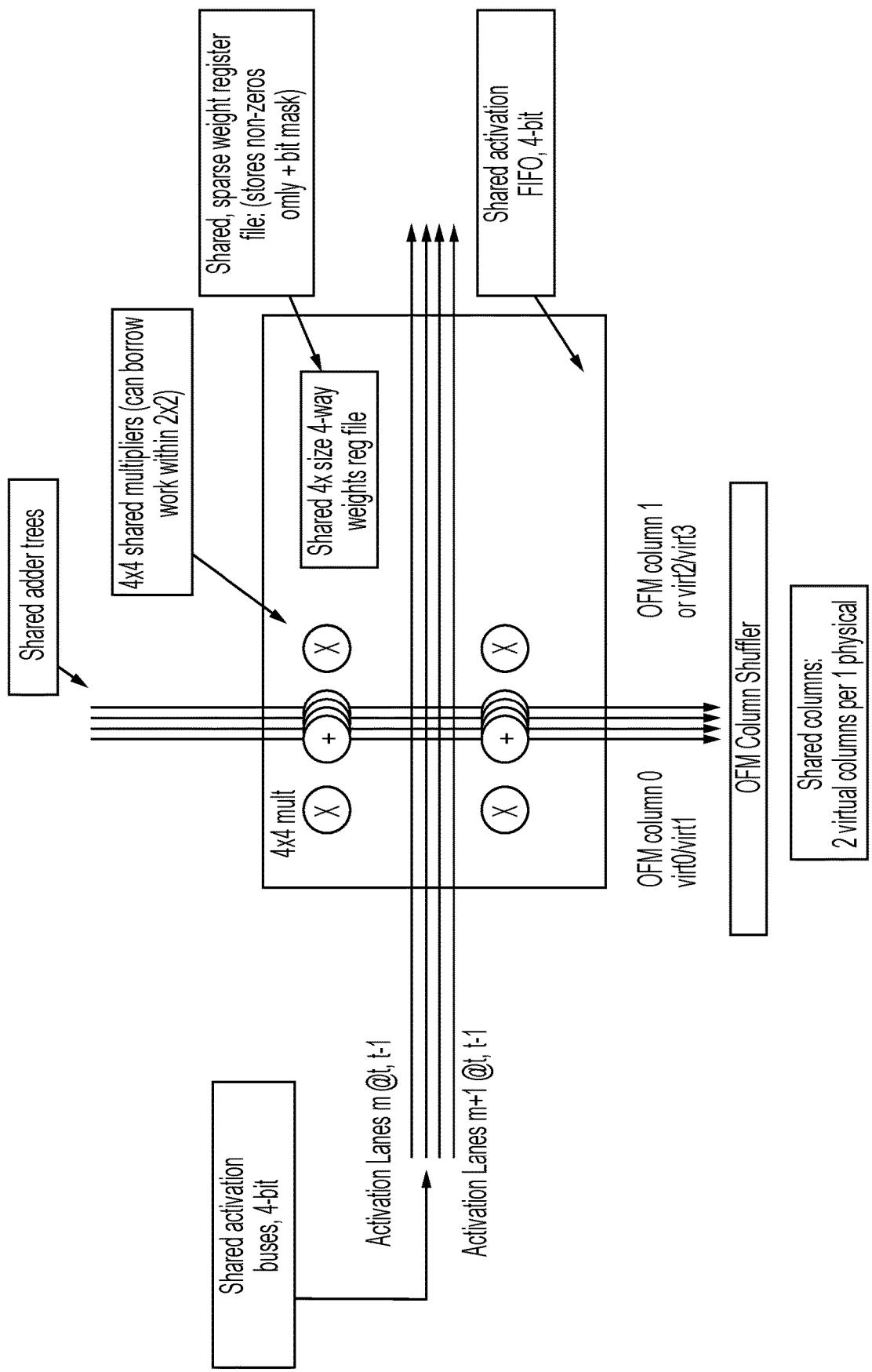
FIG. 5C is a block diagram, according to an embodiment of the present disclosure.

In some embodiments, the MAC overhead may be reduced using two by two MU resource sharing, as illustrated in FIG. 5C. In such an embodiment, activation lanes may be shared so that activations can be borrowed; multipliers 126 may be shared so that activation and weight pairs may be borrowed, both vertically and horizontally; adder trees 128 may also be shared; and weight register files 127 may be shared. The sharing of weight register files 127 may be advantageous if the merged register file 127 becomes expensive (i.e., occupies a large amount of space on the chip, because of the number of multiplexers involved) and thus weight register files 127 may require a 4-port, 18 by 4-deep configuration instead of 4 register files 127 where each has one-port by 18-deep configuration.

In another embodiment, referring to FIG. 5D, there is trivial triple sparsity when reordering IFM channels offline. By having the weights of MSNs equal to zero in the same slice for all columns, for as many IFM weight cycles as possible, trivial triple sparsity may be implemented. Most weights for the MSN are equal to zero so the entire weight slice can be zero by reordering the previous layer OFM. The multiplier 126 becomes a 4 by 4 bit instead of a 4 by 8 bit. The IFM sequencer needs to know which of the IFM weight cycles have how many 4-bit cycles; this is static information, computed at compile time.

For optical control, triple sparsity is used to share resources optically. An execution plan is computed by using approximately two clock cycles ahead of real time execution. IFM broadcast units are required to statically collect the desired weight columns which should be all zero values. This can be 4-bit-or-less, 8-bit-or less, and so on.

The weight slice MSN is known to be all zeros at compile time; however, the IFM values are unknown at compile time, which can cause the adder trees 128 to be busy, stall tiles, or require handshake signaling. However, IFM values can be fetched from IFM cache 139. Based on the fetched values, approximately two clock cycles ahead of the computation the optimal resource can be used to minimize stalls. The adder tree 128 can be borrowed, as can the MU, which includes activation and weight pairs. By replacing stall handshake signaling with the ahead-of-real-time calculation, computed resources are allocated. This requires IFM broadcasts to understand which IFM weight cycle requires a specified number of clock cycles between 0 and 4 clock cycles.

As used herein, "a portion of" something means all, or less than all, of the thing. As such, for example "a portion of an array" means all or less than all of the array. As used herein, the term "or" should be interpreted as "and/or", such that, for example, "A or B" means any one of "A" or "B" or "A and B". It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a mixed-precision neural-processing unit tile have been specifically described and illustrated herein, many modifications and variations will be apparent to those skilled in the art. Accordingly, it is to be understood that a mixed-precision neural-processing unit tile constructed according to principles of this disclosure may be embodied other than as specifically described herein. The invention is also defined in the following claims, and equivalents thereof.

What is claimed is:

1. A processor, comprising:
a first tile,
a second tile,
a memory, and
a bus,
the bus being connected to:
the memory,
the first tile, and
the second tile,
the first tile comprising:
a first weight register storing a first weight, the first weight being zero;
a second weight register storing a third weight, the third weight being an eight-bit number neither nibble of which is zero;
a third weight register storing a second weight, the second weight being zero;
a fourth weight register storing a fourth weight, the fourth weight being an eight-bit number neither nibble of which is zero;
an activations buffer;
a first shuffler;
a first multiplier connected to the first weight register;
a second multiplier connected to the second weight register;
a third multiplier connected to the third weight register; and
a fourth multiplier connected to the fourth weight register, the activations buffer being configured to include:
a first queue,
a second queue,
a third queue, and
a fourth queue,
the first tile being configured:
to feed a first nibble from the third queue, through the first shuffler, to the first multiplier, and to multiply, in the first multiplier, the first nibble from the third queue by a first nibble of the third weight;
to feed a second nibble from the third queue, through the first shuffler, to the second multiplier, and to multiply, in the second multiplier, the second nibble from the third queue by a second nibble of the third weight;
to feed a first nibble from the fourth queue, through the first shuffler, to the third multiplier, and to multiply, in the third multiplier, the first nibble from the fourth queue by a first nibble of the fourth weight; and
to feed a second nibble from the fourth queue, through the first shuffler, to the fourth multiplier, and to multiply, in the fourth multiplier, the second nibble from the fourth queue by a second nibble of the fourth weight.

2. The processor of claim 1, wherein:
a third nibble of the first queue is zero,
a third nibble of the second queue is zero,
a third nibble of the third queue is zero, and
a third nibble of the fourth queue is zero, and
the first tile is further configured, when the third nibble of the first queue is at the front of the of the first queue, to advance:

the first queue,
the second queue,
the third queue, and
the fourth queue,
without performing multiplications with any of:
  the third nibble of the first queue,
  the third nibble of the second queue,
  the third nibble of the third queue, and
  the third nibble of the fourth queue.
3. The processor of claim 2, wherein:
a fifth nibble of the first queue and a sixth nibble of the first queue together store an eight-bit number consisting of a most significant nibble and a least significant nibble, the most significant nibble being equal to one, and the least significant nibble being even; and
the first tile is configured, when processing the fifth nibble of the first queue and the sixth nibble of the first queue, to:
  replace the most significant nibble with zero;
  shift the least significant nibble to the right by one bit and set its most significant bit to one; and
  set a flag indicating that the fifth nibble of the first queue and the sixth nibble of the first queue together store the mantissa of a floating point number the exponent of which is one.
4. The processor of claim 3, wherein the first shuffler is a butterfly shuffler.
5. The processor of claim 4, wherein:
  the first multiplier,
  the second multiplier,
  the third multiplier, and
  the fourth multiplier
are arranged in a first column, and
the first tile further comprises:
  a second shuffler connected to the activations buffer;
  a fifth multiplier connected to a fifth weight register and to the second shuffler;
  a sixth multiplier connected to a sixth weight register and to the second shuffler;
  a seventh multiplier connected to a seventh weight register and to the second shuffler; and
  an eighth multiplier connected to an eighth weight register and to the second shuffler.
6. The processor of claim 1, wherein:
a fifth nibble of the first queue and a sixth nibble of the first queue together store an eight-bit number consisting of a most significant nibble and a least significant nibble, the most significant nibble being equal to one, and the least significant nibble being even; and
the first tile is configured, when processing the fifth nibble of the first queue and the sixth nibble of the first queue, to:
  replace the most significant nibble with zero;
  shift the least significant nibble to the right by one bit and set its most significant bit to one; and
  set a flag indicating that the fifth nibble of the first queue and the sixth nibble of the first queue together store the mantissa of a floating point number the exponent of which is one.
7. The processor of claim 6, wherein the first shuffler is a butterfly shuffler.
8. The processor of claim 7, wherein:
  the first multiplier,
  the second multiplier,
  the third multiplier, and
  the fourth multiplier
are arranged in a first column, and
the first tile further comprises:
  a second shuffler connected to the activations buffer;
  a fifth multiplier connected to a fifth weight register and to the second shuffler;
  a sixth multiplier connected to a sixth weight register and to the second shuffler;
  a seventh multiplier connected to a seventh weight register and to the second shuffler; and
  an eighth multiplier connected to an eighth weight register and to the second shuffler.
9. The processor of claim 1, wherein:
  the first multiplier,
  the second multiplier,
  the third multiplier, and
  the fourth multiplier
are arranged in a first column, and
the first tile further comprises:
  a second shuffler connected to the activations buffer;
  a fifth multiplier connected to a fifth weight register and to the second shuffler;
  a sixth multiplier connected to a sixth weight register and to the second shuffler;
  a seventh multiplier connected to a seventh weight register and to the second shuffler; and
  an eighth multiplier connected to an eighth weight register and to the second shuffler.
10. The processor of claim 9, wherein the first shuffler is a butterfly shuffler.
11. A method for calculating with a processing circuit, the processing circuit comprising:
  a first tile,
  a second tile,
  a memory, and
  a bus,
  the bus being connected to:
    the memory,
    the first tile, and
    the second tile,
  the first tile comprising:
    a first weight register storing a first weight, the first weight being zero;
    a second weight register storing a third weight, the third weight being an eight-bit number neither nibble of which is zero;
    a third weight register storing a second weight, the second weight being zero;
    a fourth weight register storing a fourth weight, the fourth weight being an eight-bit number neither nibble of which is zero;
    an activations buffer;
    a first shuffler;
    a first multiplier connected to the first weight register;
    a second multiplier connected to the second weight register;
    a third multiplier connected to the third weight register; and
    a fourth multiplier connected to the fourth weight register,
  the activations buffer being configured to include:
    a first queue,
    a second queue,
    a third queue, and
    a fourth queue,
  the method comprising:
    feeding a first nibble from the third queue, through the first shuffler, to the first multiplier, and multiplying, in the first multiplier, the first nibble from the third queue by a first nibble of the third weight;

feeding a second nibble from the third queue, through the first shuffler, to the second multiplier, and multiplying, in the second multiplier, the second nibble from the third queue by a second nibble of the third weight;

feeding a first nibble from the fourth queue, through the first shuffler, to the third multiplier, and multiplying, in the third multiplier, the first nibble from the fourth queue by a first nibble of the fourth weight; and feeding a second nibble from the fourth queue, through the first shuffler, to the fourth multiplier, and multiplying, in the fourth multiplier, the second nibble from the fourth queue by a second nibble of the fourth weight.

12. The method of claim 11, wherein:
a third nibble of the first queue is zero,
a third nibble of the second queue is zero,
a third nibble of the third queue is zero, and
a third nibble of the fourth queue is zero, and
the method further comprises, when the third nibble of the first queue is at the front of the of the first queue, advancing:
the first queue,
the second queue,
the third queue, and
the fourth queue,
without performing multiplications with any of:
the third nibble of the first queue,
the third nibble of the second queue,
the third nibble of the third queue, and
the third nibble of the fourth queue.

13. The method of claim 12, wherein:
a fifth nibble of the first queue and a sixth nibble of the first queue together store an eight-bit number consisting of a most significant nibble and a least significant nibble, the most significant nibble being equal to one, and the least significant nibble being even; and
the method further comprises, when processing the fifth nibble of the first queue and the sixth nibble of the first queue:
replacing the most significant nibble with zero;
shifting the least significant nibble to the right by one bit and setting its most significant bit to one; and
setting a flag indicating that the fifth nibble of the first queue and the sixth nibble of the first queue together store the mantissa of a floating point number the exponent of which is one.

14. The method of claim 13, wherein the first shuffler is a butterfly shuffler.

15. The method of claim 14, wherein:
the first multiplier,
the second multiplier,
the third multiplier, and
the fourth multiplier
are arranged in a first column, and
the first tile further comprises:
a second shuffler connected to the activations buffer;
a fifth multiplier connected to a fifth weight register and to the second shuffler;
a sixth multiplier connected to a sixth weight register and to the second shuffler;
a seventh multiplier connected to a seventh weight register and to the second shuffler; and
an eighth multiplier connected to an eighth weight register and to the second shuffler.

16. The method of claim 11, wherein:
a fifth nibble of the first queue and a sixth nibble of the first queue together store an eight-bit number consisting of a most significant nibble and a least significant nibble, the most significant nibble being equal to one, and the least significant nibble being even; and
the method further comprises, when processing the fifth nibble of the first queue and the sixth nibble of the first queue:
replacing the most significant nibble with zero;
shifting the least significant nibble to the right by one bit and setting its most significant bit to one; and
setting a flag indicating that the fifth nibble of the first queue and the sixth nibble of the first queue together store the mantissa of a floating point number the exponent of which is one.

17. The method of claim 16, wherein the first shuffler is a butterfly shuffler.

18. The method of claim 17, wherein:
the first multiplier,
the second multiplier,
the third multiplier, and
the fourth multiplier
are arranged in a first column, and
the first tile further comprises:
a second shuffler connected to the activations buffer;
a fifth multiplier connected to a fifth weight register and to the second shuffler;
a sixth multiplier connected to a sixth weight register and to the second shuffler;
a seventh multiplier connected to a seventh weight register and to the second shuffler; and
an eighth multiplier connected to an eighth weight register and to the second shuffler.

19. A method for calculating with a means for processing, the means for processing comprising:
a first tile,
a second tile,
a memory, and
a bus,
the bus being connected to:
the memory,
the first tile, and
the second tile,
the first tile comprising:
a first weight register storing a first weight, the first weight being zero;
a second weight register storing a third weight, the third weight being an eight-bit number neither nibble of which is zero;
a third weight register storing a second weight, the second weight being zero;
a fourth weight register storing a fourth weight, the fourth weight being an eight-bit number neither nibble of which is zero;
an activations buffer;
a first shuffler;
a first multiplier connected to the first weight register;
a second multiplier connected to the second weight register;
a third multiplier connected to the third weight register; and
a fourth multiplier connected to the fourth weight register,
the activations buffer being configured to include:
a first queue,
a second queue, a third queue, and
a fourth queue,
the method comprising:
- feeding a first nibble from the third queue, through the first shuffler, to the first multiplier, and multiplying, in the first multiplier, the first nibble from the third queue by a first nibble of the third weight;
- feeding a second nibble from the third queue, through the first shuffler, to the second multiplier, and multiplying, in the second multiplier, the second nibble from the third queue by a second nibble of the third weight;
- feeding a first nibble from the fourth queue, through the first shuffler, to the third multiplier, and multiplying, in the third multiplier, the first nibble from the fourth queue by a first nibble of the fourth weight; and
- feeding a second nibble from the fourth queue, through the first shuffler, to the fourth multiplier, and multiplying, in the fourth multiplier, the second nibble from the fourth queue by a second nibble of the fourth weight, wherein the first shuffler is a butterfly shuffler.

* * * * *